(12) United States Patent
Broman et al.

(10) Patent No.: US 9,323,843 B2
(45) Date of Patent: Apr. 26, 2016

(54) METHOD AND SYSTEM FOR PERFORMING BI-DIRECTIONAL SEARCH

(75) Inventors: Paul Broman, Mableton, GA (US); Jon Sweet, San Jose, CA (US); Tim Rechin, San Carlos, CA (US); Jessi Dong, Los Gatos, CA (US); Frank Yoo, San Francisco, CA (US); Burke Culligan, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 566 days.

(21) Appl. No.: 12/755,938

(22) Filed: Apr. 7, 2010

(65) Prior Publication Data
US 2011/0252343 A1 Oct. 13, 2011

(51) Int. Cl.
*G06F 17/30* (2006.01)

(52) U.S. Cl.
CPC .............................. *G06F 17/30864* (2013.01)

(58) Field of Classification Search
USPC .................................... 715/760; 707/706–707
See application file for complete search history.

(56) References Cited

U.S. PATENT DOCUMENTS

| | | | |
|---|---|---|---|
| 6,549,941 B1 * | 4/2003 | Jaquith et al. | 709/219 |
| 7,225,187 B2 | 5/2007 | Dumais et al. | |
| 7,287,042 B1 * | 10/2007 | Jassy et al. | |
| 7,890,526 B1 * | 2/2011 | Brewer et al. | 707/767 |
| 2003/0120779 A1 | 6/2003 | Rodefer et al. | |
| 2004/0225716 A1 | 11/2004 | Shamir et al. | |
| 2005/0149500 A1 * | 7/2005 | Marmaros et al. | 707/3 |
| 2006/0064411 A1 * | 3/2006 | Gross et al. | 707/3 |
| 2006/0190441 A1 * | 8/2006 | Gross et al. | 707/3 |
| 2008/0313147 A1 * | 12/2008 | Svore et al. | 707/3 |

OTHER PUBLICATIONS

Hartzer, Bill, SearchBoth.co.uk Launches UK's First Website That Searches Both Google and Yahoo, Nov. 14, 2007, http://www.billhartzer.com/pages/searchbothcouk-launches-uks-first-website-that-searches-both-google-and-yahoo/.*
Billhartzer.com, SearchBoth.co.uk Launches UK's First Website That Searches Both Google and Yahoo, Nov. 16, 2007, https://web.archive.org/web/20071116053837/http://www.billhartzer.com/pages/searchbothcouk-launches-uks-first-website-that-searches-both-google-and-yahoo/.*

* cited by examiner

*Primary Examiner* — William Trapanese
(74) *Attorney, Agent, or Firm* — James J. DeCarlo; Greenberg Traurig, LLP

(57) ABSTRACT

When a user enters a primary search query into a primary search query input area to perform a first search of the primary search query, disclosed is a method and system for automatically entering the primary search query into a secondary search query input area to perform a second search of the primary search query. When the user enters a secondary search query into the secondary search query input area to perform a first search of the secondary search query, the method and system automatically enters the secondary search query into the primary search query input area to perform a second search of the secondary search query.

19 Claims, 22 Drawing Sheets

```
<concept name="Jaguar Cars" aboutness="1.9230769230769231"wight="0.5804843304843305"/>
   <category name="British brands"weight="1.9040181548762"/>
   <category name="Car manufacturers"weight="1.8389340674406884"/>
   <category name="Tata Group"weight="1.1796241873607398"/>
   <category name="Covery motor companies"weight="1.1796241873607398"/>
   <category name="Motor vehicle manufacturers of the United Kingdom"weight="1.03618058"/>
   <category name="Electric vehicle manufacturers" weight="0.9187957536318161"/>
   <category name="Luxury motor vehicle manufacturers"weight="0.7577415839544139"/>
   <category name="Jaguar"weight="0.3628027065527065"/>
   <category name="Companies established in 1922"weight="0.3628027065527065"/>
   <category name="Plug-in hybrid vehicles"weight="0.3628027065527065"/>
<concept>
```
— 1605

```
<concept name="BBC News" weight="0.8797708515915188"aboutness="0.3396739130434 7827"hm="0.2450584203632473 8"></concept>
<concept name="Ford Motor Company" weight="0.7413240627721461"aboutness="0.8720930232255814"hm="0.4007045349363803 6"></concept>
<concept name="BBC" weight="0.7135279389850 2" aboutness="0.3993610223642173"hm="0.2560500025739331 8"></ />
<concept name="Rover Company" weight="0.6750121654501215" aboutness="1.9083969465648856"hm="0.4986400138669482"></concept>
<concept name="Land Rover" weight="0.6319022038427318"aboutness="1.2254901960784315" hm="0.4169231852797994"></concept>
<concept name="Jaguar Cars" weight="0.5804843304843305"aboutness="1.9230769230769231"hm+"0.4458912353649 1954"></concept>
<concept name="Business"weight="0.5493574592375493"aboutness="0.0hm="0.0"></concept>
<concept name="United Kingdom" weight="0.5372257337983145"aboutness="0.0607976653649 49805"hm="0.0546167097088133 06"></concept>
```

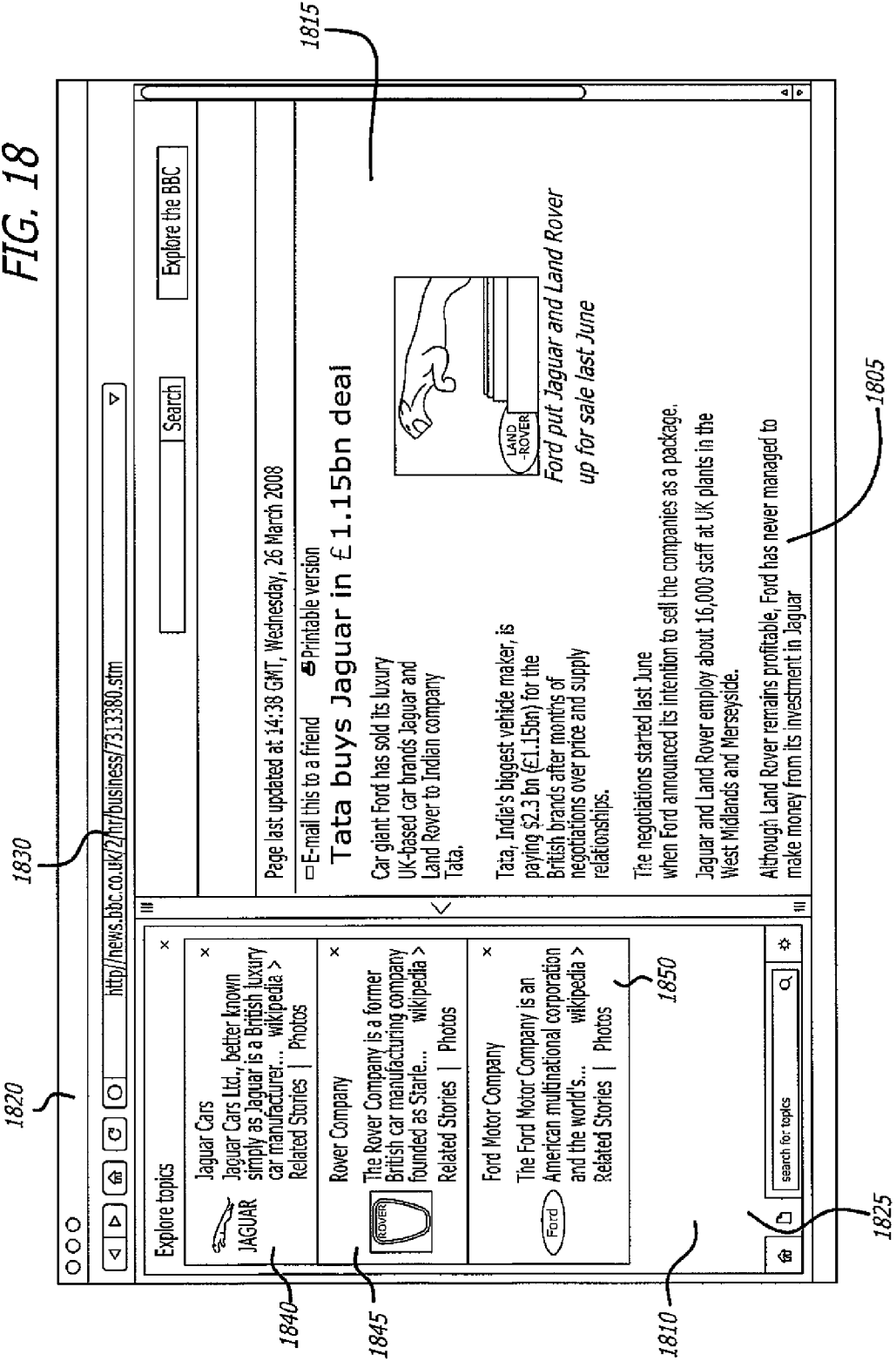

METHOD AND SYSTEM FOR PERFORMING BI-DIRECTIONAL SEARCH

FIELD

The present disclosure relates to web searching, and more specifically to a method and system for performing bi-directional search.

BACKGROUND

The World Wide Web enables access to a large amount of information. Typically, a user locates one or more web pages of interest by performing a web search using particular web page (e.g., www.yahoo.com provided by Yahoo! Inc. of Sunnyvale, Calif., www.google.com provided by Google Inc. of Mountain View, Calif.). The result of the web search is typically displayed in the window to which the user entered his or her search query.

SUMMARY

Sometimes, the search results of a user's search may not provide the information that the user was expecting or wanted. The user then has to refine the search query to more accurately define his or her search query. Performing multiple searches before receiving the correct results takes time and is often burdensome for the user. There still remains a need, therefore, to enable a user to perform multiple searches when entering a single search query in a search query input area.

In one aspect, when a user enters a search query into a primary search query input area to perform a first search of the search query, a client-side module executing on a computing device automatically enters the search query into a secondary search query input area to perform a second search of the search query. When the user enters a search query into the secondary search query input area to perform a first search of the search query, the client-side module automatically enters the search query into the primary search query input area to perform a second search of the search query.

In one embodiment, the entering of the first (or second) search query into the secondary (or primary) search query input area further comprises entering the search query as a query parameter associated with a web page into an address bar of a browser executing on the computing device. In one embodiment, the client-side module determines an intent of the user when the user enters the search query into the primary (or secondary) search query input area. In one embodiment, the secondary (or primary) search query input area is determined based on the intent of the user. The results of the second search and the first search are displayed. In one embodiment, the results are personalized results associated with the user.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 16B is an example of an output window of the disambiguation example of FIG. 16A in accordance with an embodiment of the present disclosure;

FIG. 17A is a screen shot of a selection example in accordance with an embodiment of the present disclosure;

FIG. 17C is an example of an output window of the selection example of FIG. 17A in accordance with an embodiment of the present disclosure;

FIG. 18 is a screen shot of a web document to which the user has navigated and a sidebar in accordance with an embodiment of the present disclosure.

DESCRIPTION OF EMBODIMENTS

Figure 1:
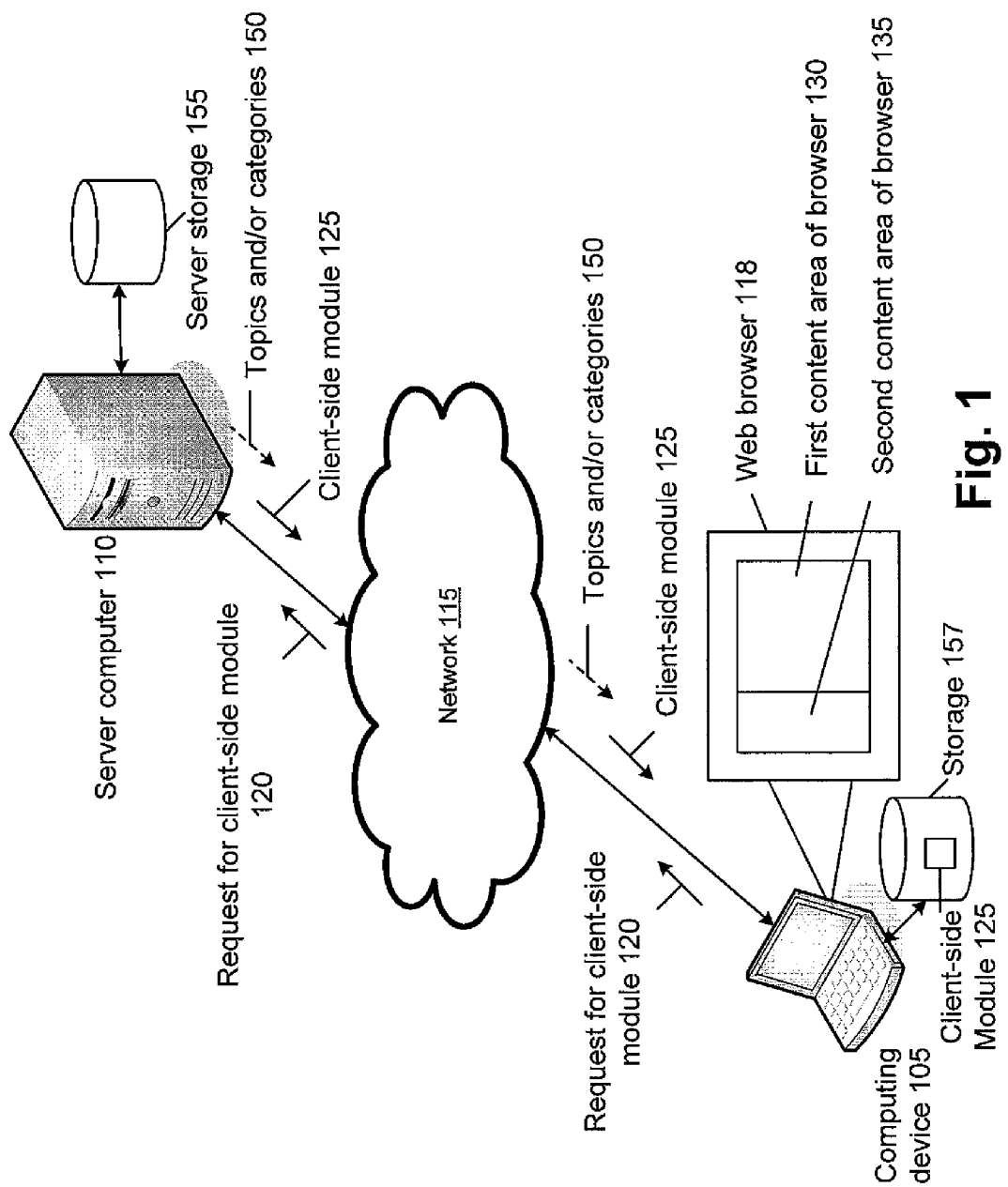
FIG. 1 is a block diagram of a client-side module of a computing device communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
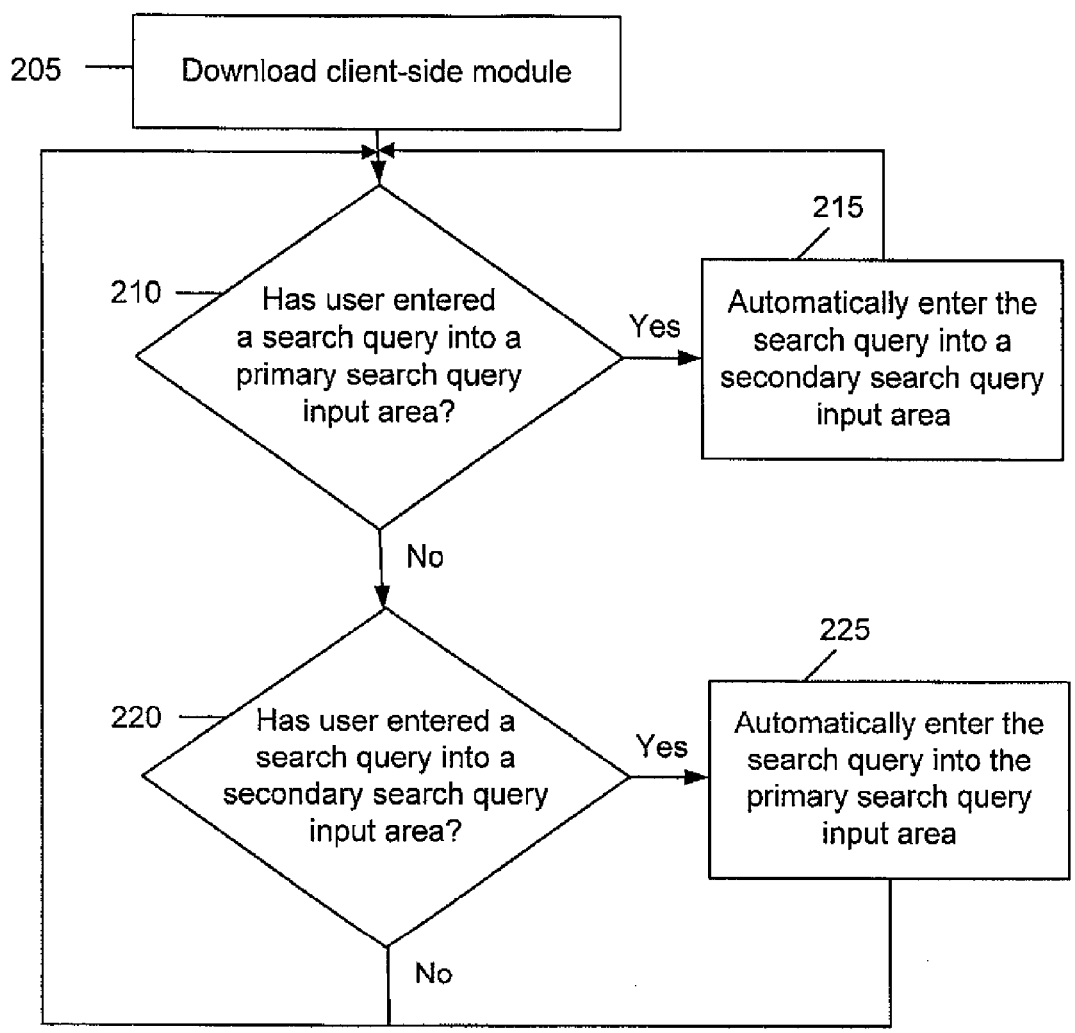
FIG. 2 is a flowchart illustrating steps performed by the computing device of FIG. 1 in accordance with an embodiment of the present disclosure.

FIG. 1 is a block diagram of an embodiment of a computing device 105 communicating with a server computer 110 over a network 115 such as the Internet. FIG. 2 is a flowchart illustrating an embodiment of steps performed by the computing device 105 of FIG. 1. A user of the computing device 105 uses a web browser 118 executing on the computing device 105 to, for example, navigate to a web page (e.g., Yahoo!'s home page—www.yahoo.com) associated with a service provider (e.g., Yahoo! Inc. of Sunnyvale, Calif.). In one embodiment, the user logs into (or creates) a user account with the service provider. In one embodiment, the server computer 110 receives a request for the user to log into the account and, if the login information is correct, logs the user into the user account.

In one embodiment, the computing device 105 transmits a request 120 to download a client-side module 125 from the server computer 110. In one embodiment, the client-side module 125 is a sidebar. In another embodiment, the client-side module 125 is a toolbar. In one embodiment, the client-side module 125 modifies content displayed with (e.g., below) a web page address bar. In one embodiment, the server computer 110 transmits the client-side module 125 to the computing device 105. The client-side module 125 is downloaded by the computing device 105 (step 205) and, once the client-side module 125 is downloaded, in one embodiment a graphical user interface (UI) associated with the client-side module 125 is displayed when the browser 118 navigates to a web page (associated with or not associated with the service provider). In one embodiment, the graphical UI is displayed when the user selects to have the UI displayed. In one embodiment, the client-side module 125 is stored in storage 157.

For purposes of this disclosure (and as described in more detail below with respect to FIG. 5), a computer or computing device such as the computing device 105 and/or server 110 includes a processor and memory for storing and executing program code, data and software which may also be tangibly stored or read from any type or variety of well known computer readable storage media such as magnetic or optical discs or RAM-discs or tape, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 105 and the server 110 can, in one embodiment, also include a display, such as a screen or monitor. Further, the server and/or computing device may include one or more computers.

Figure 3:
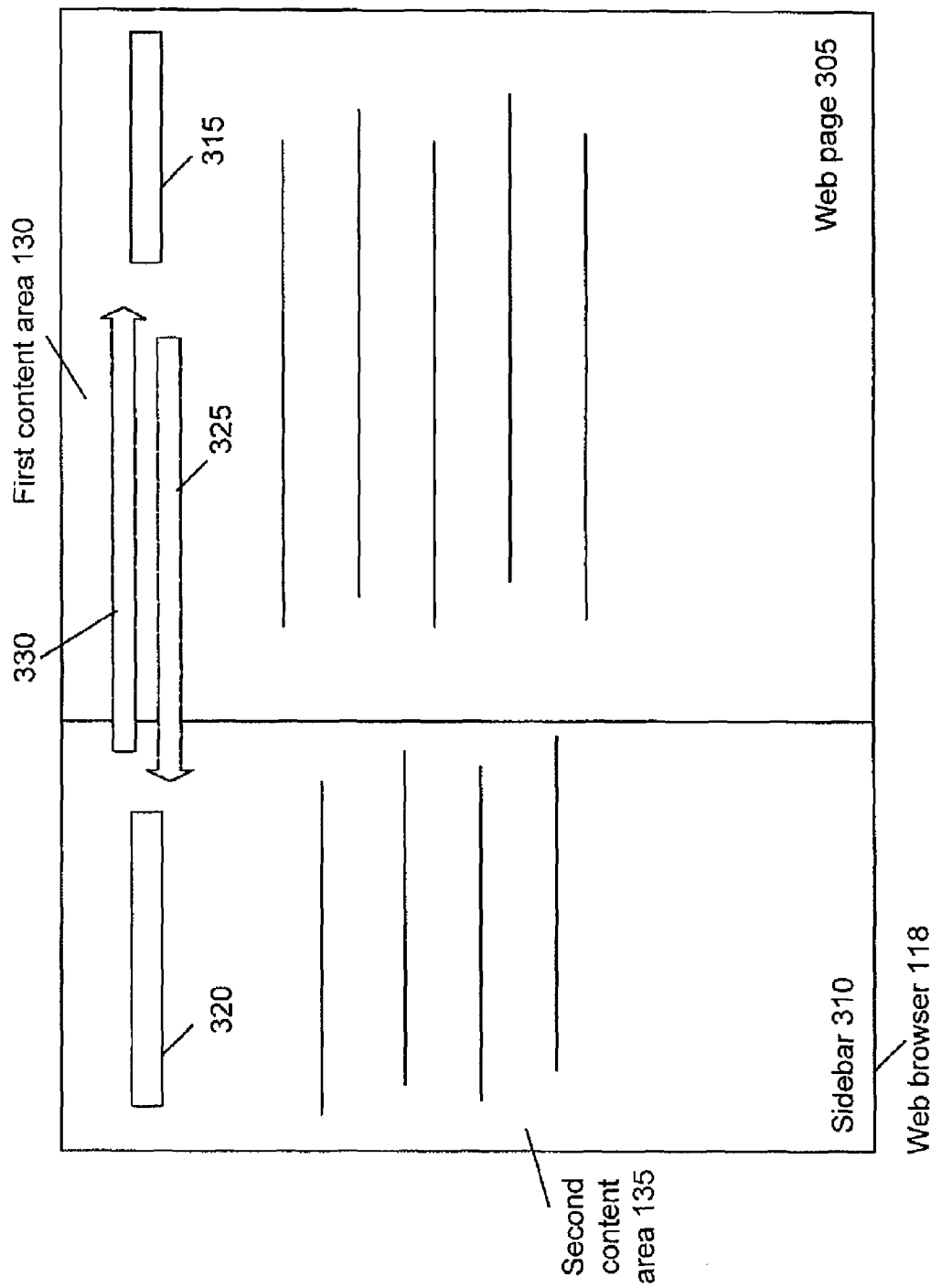
FIG. 3 is a block diagram illustrating a first content area and a second content area of a web browser executing on the computing device of FIG. 1 in accordance with an embodiment of the present disclosure.

Also referring to FIG. 3, the web browser 118 can display in a first content area 130 of the web browser 118 a web page 305 and in a second content area 135 of the web browser 118 a graphical user interface (UI) associated with the client-side module 125. In one embodiment, the graphical UI of the client-side module 125 is sidebar 310. The size of the first content area 130 can be larger than or smaller than the size of the second content area 135. In one embodiment, the size of either or both content areas is adjustable by the user.

In one embodiment, the web page 305 includes a primary search query input area 315 and the sidebar 310 includes a secondary search query input area 320. For example, the user can navigate using the first content area 130 to a web page 305 that has a primary search query input area 315, such as www.yahoo.com provided by Yahoo! Inc. of Sunnyvale, Calif. or www.google.com provided by Google Inc. of Mountain View, Calif. In another embodiment, the search query input areas 315, 320 are part of the web browser 118. As used herein, a search query input area is an area of a web page or web browser into which a user can enter (e.g., type) a search query to be searched (e.g., on the web, locally in storage 157 of the computing device 105, etc.).

In one embodiment, the client-side module 125 checks whether the user has entered (e.g., typed) a search query into the primary search query input area 315 to perform a first search of the search query (step 210). If so, the client-side module 125 automatically enters the search query into the secondary search query input area 320 to perform a second search of the primary search query (step 215). In another embodiment, the search query is passed to a web page using query parameters to perform the second search of the search query. For example, the client-side module 125 can pass the search query to www.google.com via the query-string parameter "q". In one embodiment, the client-side module 125 navigates to the web page as if the user had entered the address into the address bar. The process can then return to step 210.

If not, the client-side module 125 checks whether the user has entered (e.g., typed) a search query into the secondary search query input area 320 (step 220). If so, the client-side module 125 automatically enters the search query into the primary search query input area 315 (step 225). In another embodiment, the search query is passed to a web page using query parameters to perform the primary search of the search query. For example, the client-side module 125 can pass the search query to www.google.com via the query-string parameter "q". In one embodiment, the client-side module 125 navigates to the web page as if the user had entered the address into the address bar. In one embodiment, the process then returns to step 210. It should be noted that the steps 210 and 220 can occur in any order.

Thus, a bi-directional search is enabled via the client-side module 125 because a user can perform two searches at any given time by entering a search query into one of the primary search query input area 315 or the secondary search query input area 320. This bi-directional search aspect is shown in FIG. 3 with arrows 325 and 330.

Figure 4:
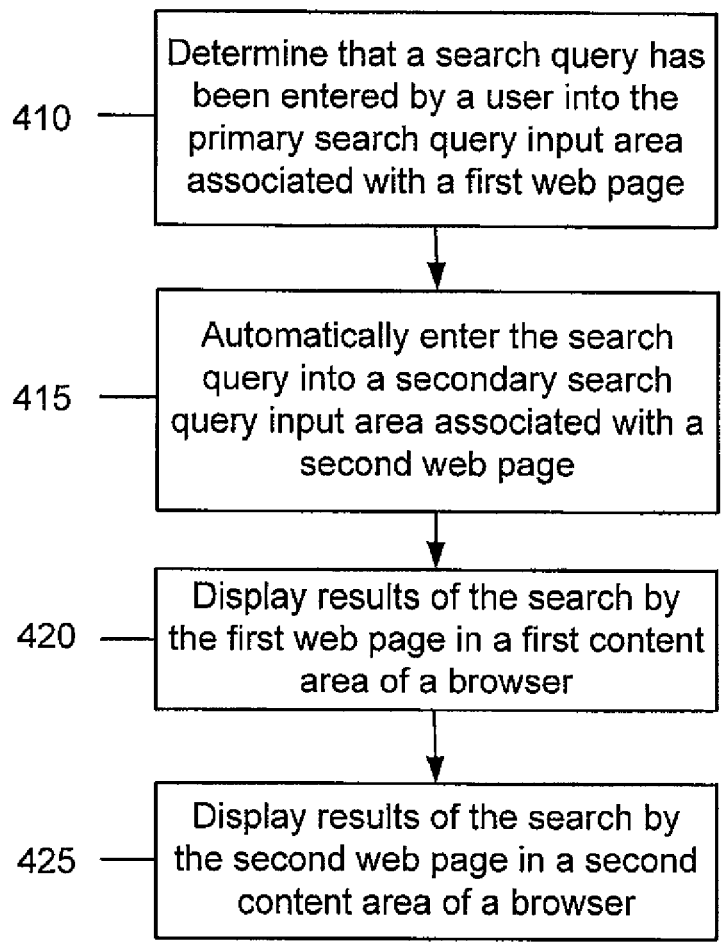
FIG. 4 is a flowchart of steps performed by the computing device of FIG. 1 when a user of the computing device enters a search query into a primary search query input area in accordance with an embodiment of the present disclosure.

FIG. 4 is a flowchart illustrating an embodiment of steps performed by the client-side module 125 when the user enters a search query into the primary search query input area 315 associated with a search tool represented by a first web page.

In one embodiment, the user navigates to a first web page such as www.google.com. The user then enters (e.g., types) a search query into the primary search query input area 315 associated with the first web page 305. Alternatively, the user enters (e.g., types) a search query into the primary search query input area 315, where the primary search query input area 315 is part of the browser 118.

The client-side module 125 determines that a search query has been entered by the user into a primary search query input area 315 associated with the first web page (step 410). In one embodiment, the client-side module 125 scans the Document Object Model (DOM) of the first web page to determine the location of the primary search query input area 315 (or areas). In another embodiment, the client-side module 125 scans the text of the first web page (e.g., looks for text containing the word "Search") to determine the location of the primary search query input area 315.

In another embodiment, the client-side module 125 determines the format of a search query for the first web page. For example, the client-side module 125 determines that the path associated with a search query for www.google.com is of the form google.com/search, where/search contains a query-string parameter of "q".

In one embodiment, the client-side module 125 automatically enters the same search query into a secondary search query input area 320 associated with a search tool represented by a second web page (e.g., www.yahoo.com, www.amazon.com, www.dictionary.com, www.wikipedia.com, etc.) (step 415). In one embodiment, the entering of the same search query into the secondary search query input area 320 associated with the second web page includes opening a second instance of a browser in the second content area 135 and then automatically entering the search query into the secondary search query input area 320 of the second instance of the browser. In another embodiment, the entering of the same search query into the secondary search query input area 320 associated with the search tool represented by the second web page includes opening a second instance of a browser in the second content area 135, navigating to a second web page, and then automatically entering the search query into a secondary search query input area 320 associated with the second web page in the second instance of the browser. In one embodiment, the user selects the second web page. In another embodiment, the second web page is a default web page. In another embodiment, the search query is passed to a web page using query parameters to perform the second search of the search query.

The web browser 118 then displays results of the search by the first web page 305 in the first content area 130 of the browser 118 (step 420) and displays results of the search by the second web page in the second content area 135 of the browser 118 (step 425). Thus, in one embodiment the bi-directional search enables a user to conduct two searches automatically. Although described above with respect to FIG. 4 as being associated with a web page, the search query input areas 315, 320 may or may not be associated with a particular web page. For example, one or more of the search query input areas 315, 320 may be associated with storage 157 of the computing device 105.

Figure 5:
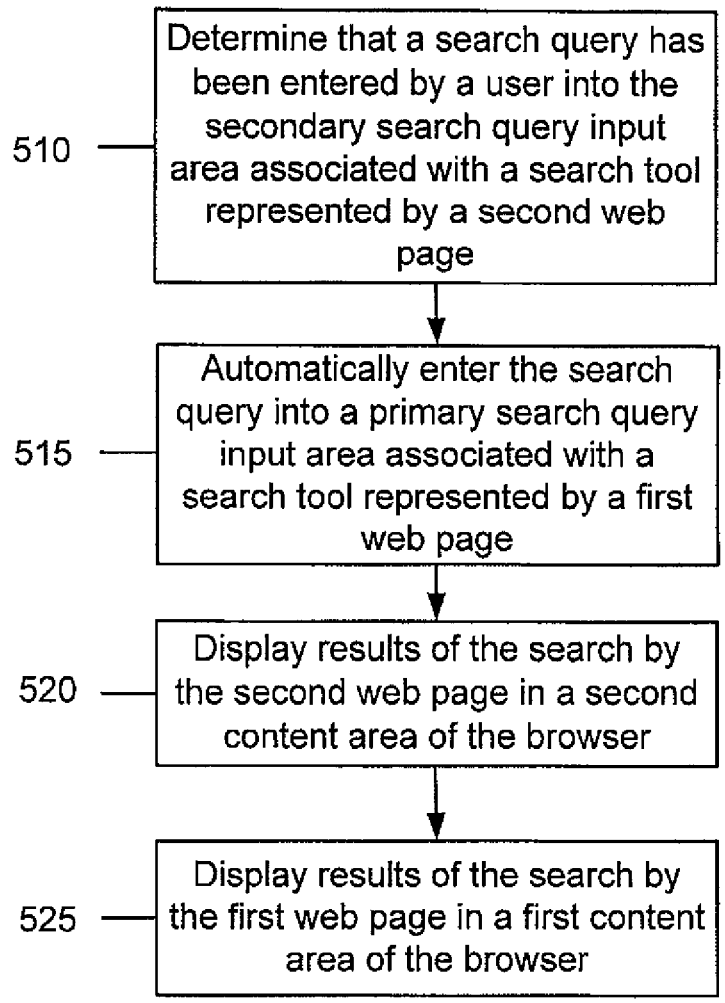
FIG. 5 is a flowchart of steps performed by the computing device of FIG. 1 when a user of the computing device enters a search query into a secondary search query input area in accordance with an embodiment of the present disclosure.

FIG. 5 is a flowchart illustrating an embodiment of steps performed by the client-side module 125 when the user enters a search query into the secondary search query input area 320. The user enters a search query into the secondary search query input area 320 associated with a second web page. The client-side module 125 determines that a search query has been entered by the user into a secondary search query input area 320 associated with a search tool represented by a second web page (step 510). In one embodiment, the client-side module 125 automatically enters the same search query into the primary search query input area 315 associated with a search tool represented by a first web page (e.g., www.yahoo.com, www.amazon.com, www.dictionary.com, www.wikipedia.com, etc.) (step 515). In one embodiment, the entering of the same search query into the primary search query input area 315 associated with a web page includes passing the secondary search query to a web page via a query parameter. For example, the client-side module 125 can pass the secondary search query to www.google.com via the query-string parameter "q". In one embodiment, the client-side module 125 navigates to the web page as if the user had entered the address into the address bar.

In one embodiment, the client-side module 125 displays results of the search by the second web page in the second content area 135 of the browser 118 (step 520). The browser 118 also displays the results of the search by the first web page 305 in the first content area 130 of the browser 118. Although described above with respect to FIG. 5 as being associated with a web page, the search query input areas 315, 320 may or may not be associated with a particular web page. For example, one or more of the search query input areas 315, 320 may be associated with storage 157 of the computing device 105.

Figure 6:
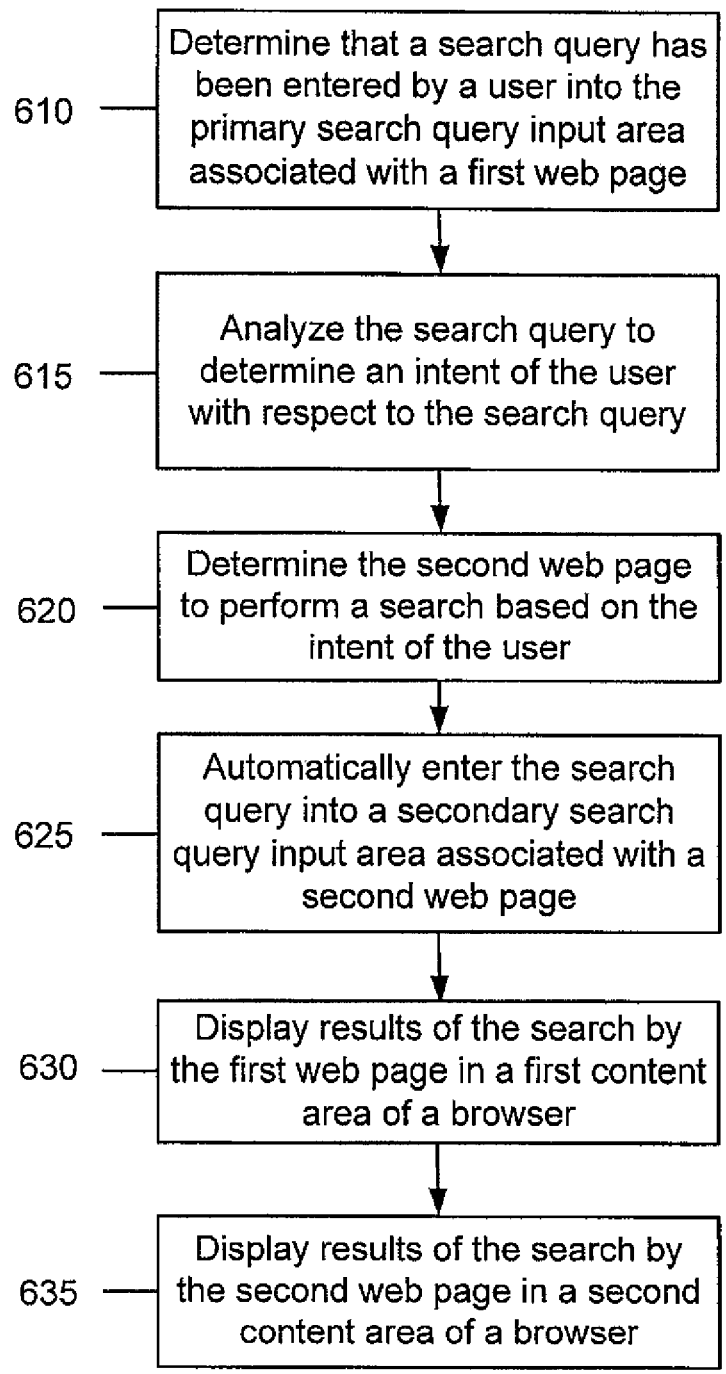
FIG. 6 is a flowchart of steps performed by the computing device of FIG. 1 based on intent of the user of the computing device when the user enters a search query into a primary search query input area in accordance with an embodiment of the present disclosure.

FIG. 6 is a flowchart illustrating an embodiment of steps performed by the computing device 105 of FIG. 1 to determine a second web page for performing a search associated with a secondary search query input area 320. As described above, the client-side module 125 determines that a search query has been entered by a user into the primary search query input area 315 associated with the first web page 305 (step 610).

In one embodiment, the client-side module 125 then analyzes the search query to determine an intent of the user with respect to the search query (step 615). For example, suppose the search query entered into the primary search query input area 315 of the first web page 305 by the user is "buy digital camera". Further suppose that the first web page 305 is www.google.com. The client-side module 125 analyzes this search query to determine that, in this example, the user is likely interested in shopping for a digital camera. In one embodiment, the client-side module 125 compares each word of the search query with each word in a table stored in storage 157. The table includes a mapping of particular words to likely intent for the search query, such as the word "buy" with the intent of shopping. In one embodiment, the client-side module 125 determines the second web page to perform a search based on the intent of the user (step 620). The client-side module 125 can automatically perform a search in a secondary search query input area 320 associated with a second web page such as www.amazon.com for digital cameras (step 625).

The web browser 118 then displays the result of the search by the first web page (www.google.com) in the first content area 130 of the browser 118 (step 630) and the result of the search by the second web page (www.amazon.com) in the second content area 135 of the browser 118 (step 635). In one embodiment, displaying the result of the search by the second web page (www.amazon.com) includes displaying prices and/or different models of digital cameras that Amazon.com, Inc. sells via www.amazon.com.

In one embodiment, the client-side module 125 determines the second web page as www.amazon.com based on the intent of the user (step 620). In this example, the search query of "buy digital camera" indicates that the intent of the user is shopping for a digital camera. If the determined intent is shopping, in one embodiment the client-side module 125 uses www.amazon.com as the second web page. This intent of shopping (from the word "buy") is independent of the user. In one embodiment, the client-side module 125 configures the second content area 135 of the web browser 118 and/or the displayed result of the search query in the second content area 135 based on the determined intent of the user.

In another example, the user enters into one of the search query input areas 315, 320 "Nikon D5000". The client-side module 125 can, in one embodiment, determine that the query is a product name and further that the search query lacks intent modifiers. As a result, the client-side module 125 can determine that the intent of the user is shopping and can display, in the second content area 135, purchasing information such as vendors, prices, etc. If the user enters a search query of "Nikon D5000 reviews" into one of the search query input areas 315, 320, the client-side module 125 can determine that there is an intent modifier of "reviews". Based on this intent modifier, the client-side module 125 can determine that the user is likely interested in professional and consumer reviews, information that is valuable for product evaluation. In this embodiment, the client-side module 125 can display these reviews in, for example, the second content area 135 when the user has entered this search query in the primary search query input area 315.

In another example, the user enters into one of the search query input areas 315, 320 "How Digital SLR cameras work". The client-side module 125 can, in one embodiment, determine that there are intent modifiers of "How" and "work" in this query. In one embodiment, the client-side module 125 determines that the content category is "General" and determines that the user is likely interested in canonical information such as history and reference information.

Although described as a search query being entered into the primary search query input area 315, the above description with respect to FIG. 6 also applies when the search query is entered into the secondary search query input area 320.

Figure 7:
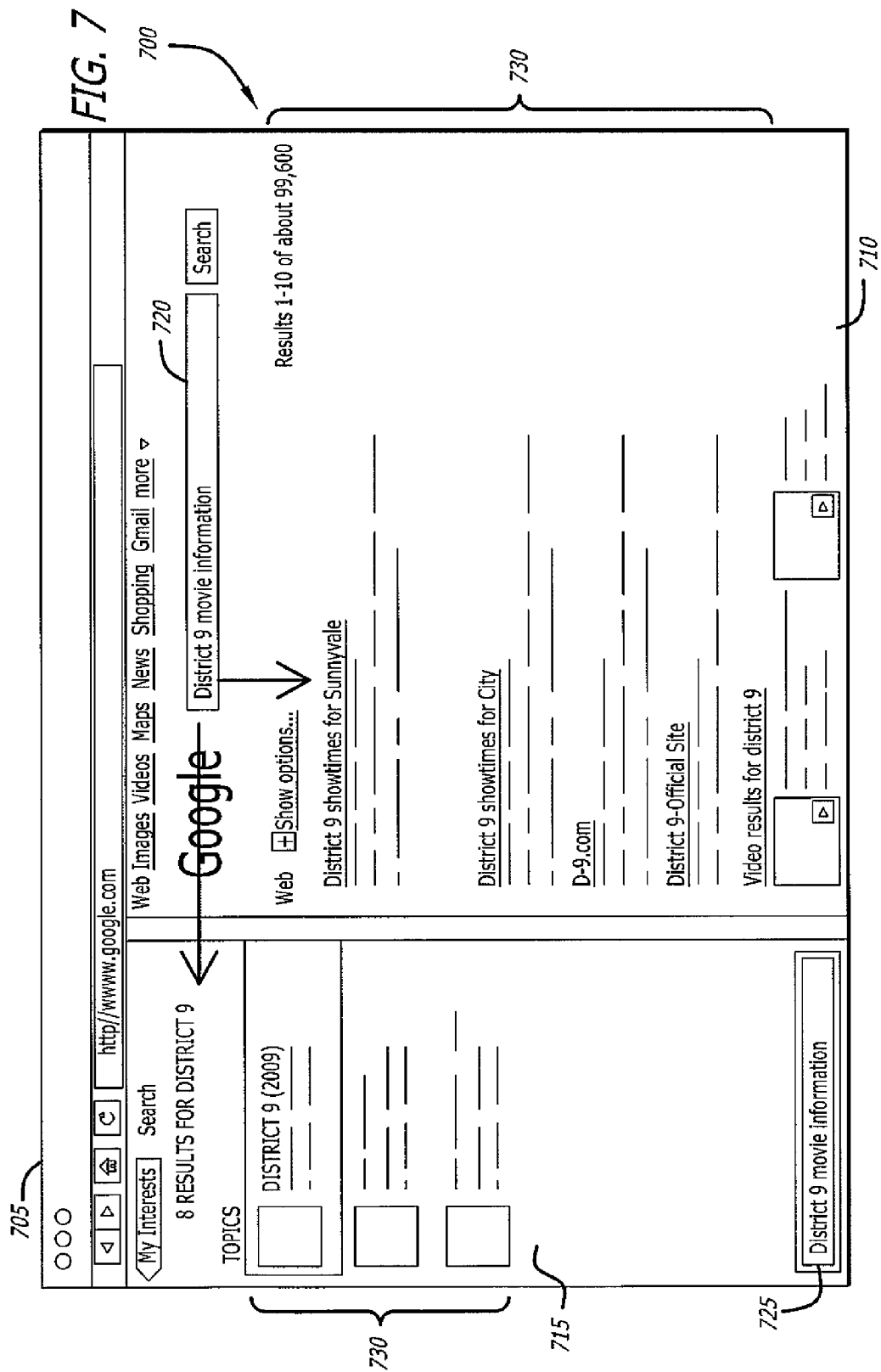
FIG. 7 is a screen shot of a first content area and a second content area of a web browser executing on the computing device of FIG. 1 in accordance with an embodiment of the present disclosure.

FIG. 7 is a screen shot 700 of a web browser 705 having a first content area 710 and a second content area 715. The user enters "District 9 movie information" into a primary search query input area 720 associated with www.google.com as a search query. In one embodiment, the client-side module 125 enters this same search query (e.g., the same text) into a secondary search query input area 725. The first content area 710 displays search results 730 related to the search query. The second content area 715 displays, for example, one or more reviews related to the search query. In one embodiment, and as described in more detail below, the client-side module 125 displays in the second content area 715 one or more topics 730 associated with the search query.

In one embodiment, the client-side module 125 determines an intent of the user with respect to the search query by determining a topic and/or category associated with the search query. In one embodiment, the client-side module 125 transmits the search query to the server computer 110 and requests one or more topics and/or one or more categories associated with the search query. In one embodiment, the server computer 110 determines from data stored in server storage 155 or from an analysis of the search query a set of topics and/or a set of categories associated with the search query. A set of topics associated with a search query is defined herein as one or more topics associated with the search query. A topic may be part of or not part of the web page's title, URL, graphics, etc. and is typically determined by analyzing at least a portion of the text of the web page. A set of categories associated with a search query is defined herein as one or more categories associated with the search query. A category compared to a topic is a higher level of abstraction. For example, if a search query is related to a Nikon digital camera, the topic of the search query can be digital cameras while the category of the search query can be purchasable products.

The server computer 110 of FIG. 1 transmits a set of topics and/or a set of categories 150 associated with the search query to the computing device 105. In one embodiment, the set of topics and/or categories 150 have been ordered or ranked in accordance with their relevance to the search query itself. For example, a set of topics associated with a search query about Nikon digital cameras can be listed as:
1. Digital cameras
2. Cameras
3. Photography.

In one embodiment, a set of categories associated with the search query about Nikon digital cameras can be listed as:
1. Purchasable products
2. Consumer goods.

In one embodiment, the server computer 110 transmits the entire set of topics and the entire set of categories 150 to the computing device 105. In another embodiment, the server 110 transmits a predetermined number of the determined topics and categories (e.g., the first topic and the first category in each set). The computing device 105 receives the topics and categories 150. In one embodiment, the computing device 105 stores the topics and categories 150 in a storage 157 (e.g., a memory or database). In one embodiment, the computing device 105 configures the second content area 135 of the web browser 118 according to a received category. For example, if a category associated with a search query is "Sports", in one embodiment the computing device 105 displays sports-related advertisements in the second content area 135. As another example, the computing device 105 can display sports-related graphics in the second content area 135.

In one embodiment, the second web page is determined based on one or more of the topics and/or categories in the set of topics/categories associated with the search query entered into the search query input area.

Figure 8:
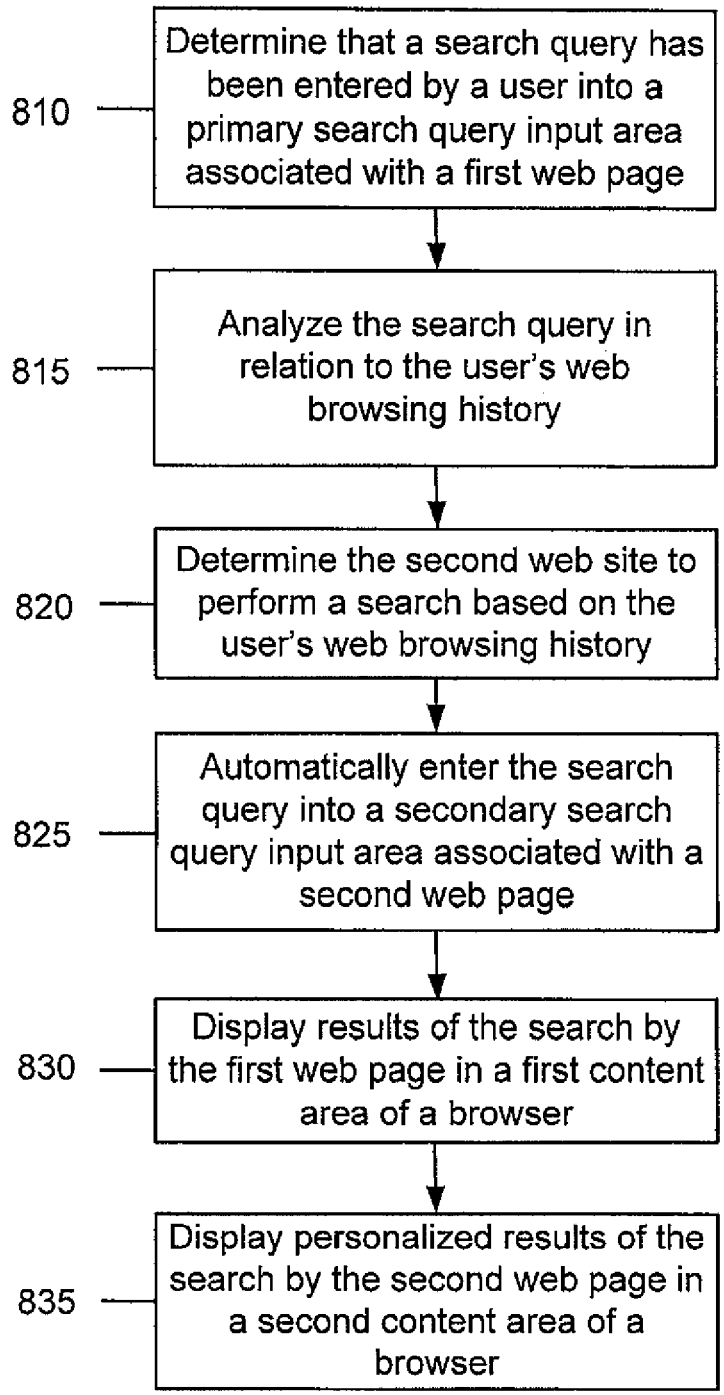
FIG. 8 is a flowchart of steps performed by the computing device of FIG. 1 based on the user's web browsing history when the user enters a search query into a search query input area in accordance with an embodiment of the present disclosure.

FIG. 8 is a flowchart illustrating an embodiment of steps performed by the computing device to provide personalized search results to the user. As described above, the computing device 105 downloads the client-side module 125 if this step has not already occurred. The client-side module 125 then determines that a search query has been entered by a user into a primary search query input area associated with a first web page (step 810). In one embodiment, the client-side module 125 analyzes the search query in relation to the user's web browsing history (step 815). In one embodiment, the web browsing history of the user is stored in storage 157. Alternatively, the server 110 transmits the web browsing history of the user to the computing device 105 when the user logs into his or her user account. In one embodiment, the client-side module 125 determines the second web page to perform a search based on the user's web browsing history (step 820). The client-side module 125 automatically enters the search query into the search query input area associated with the second web page (step 825). The client-side module 125 displays the results of the search by the first web page in the first content area 130 (step 830) of the browser 118 and displays personalized search results of the search by the second web page in the second content area 135 of the browser 118 (step 835).

For example, if the user has searched for Canon Powershot® digital cameras on www.amazon.com during the past week, the client-side module 125 can display the personalized search results by displaying search results to a search query using www.amazon.com via the second content area 135 of the browser 118. Thus, in one embodiment searches are submitted on websites that the user has previously used that match categorically with a current query term.

Figure 9:
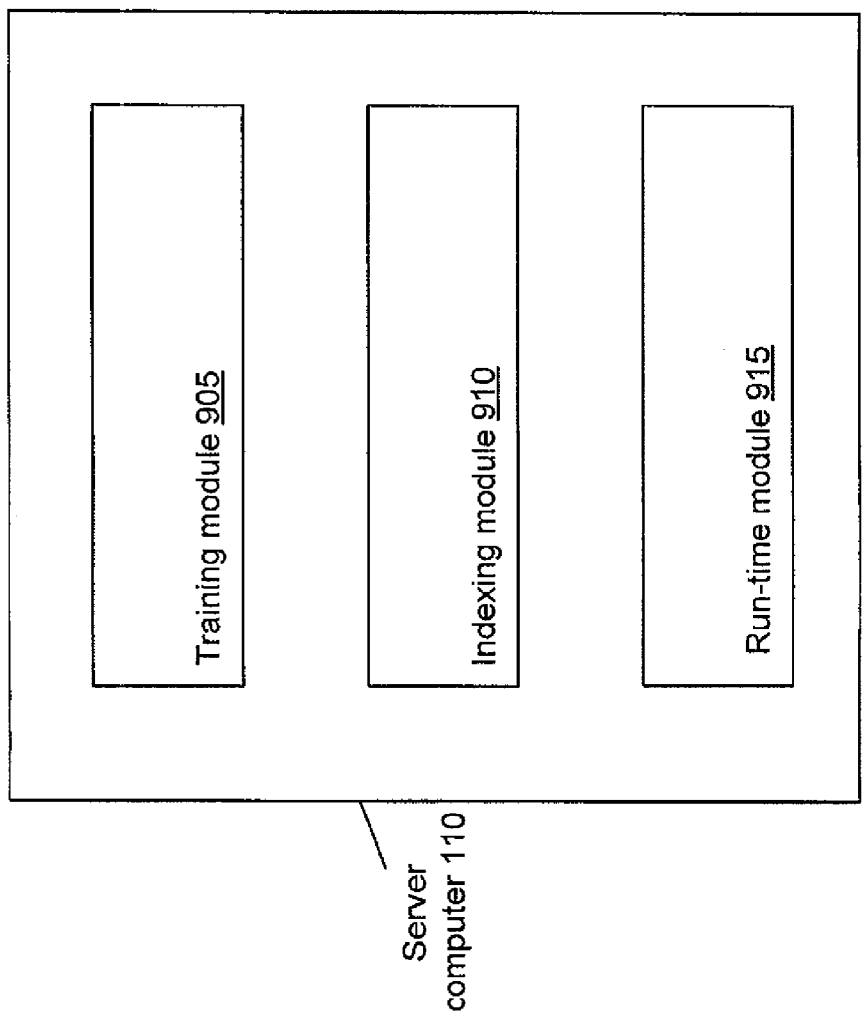
FIG. 9 is a block diagram of an embodiment of the server computer of FIG. 1 having a training module, an indexing module, and a run-time module in accordance with an embodiment of the present disclosure.
Figure 10:
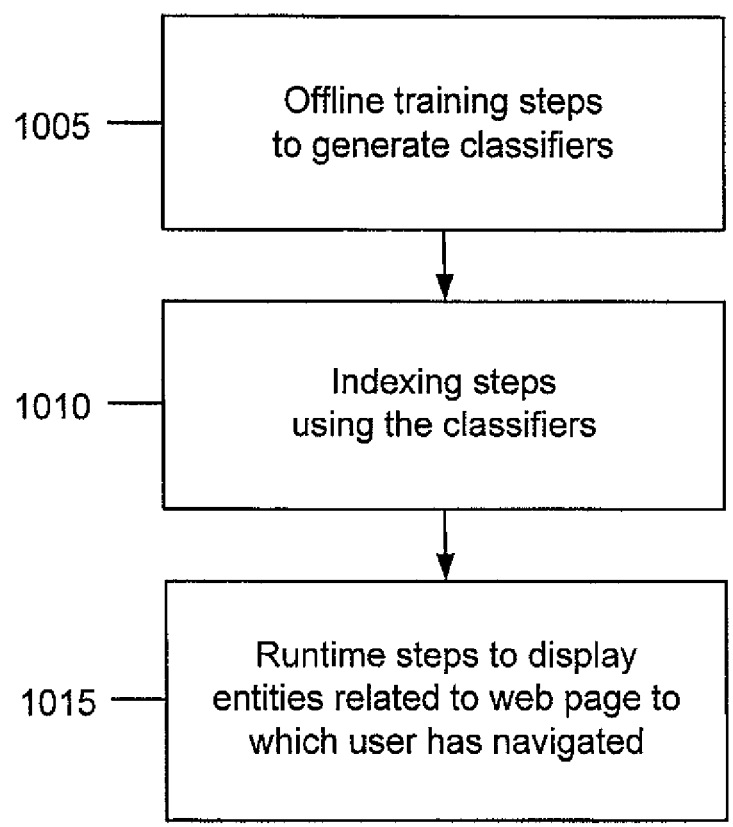
FIG. 10 is a flowchart illustrating the steps performed by the server computer modules of FIG. 9 in accordance with an embodiment of the present disclosure.

FIG. 9 is a block diagram of an embodiment of the server computer 110 of FIG. 1. In one embodiment, the server computer 110 includes a training module 905, an indexing module 910 and a run-time module 915. FIG. 10 is a flowchart illustrating the steps performed by the modules 905, 910, 915 of FIG. 9. The training module 905 performs offline training steps (step 1005) to generate two supervised machine learning models (referred to below as classifiers). As described in more detail below, the offline training steps include retrieving data and analyzing the retrieved data in order to be able to generate one or more classifiers that can then be applied to a web page in order to determine a set of topics and categories for the web page. The indexing module 910 performs indexing steps using the classifiers generated in the training steps. The indexing steps include retrieving a web page and analyzing the web page to determine a set of topics and categories for the web page. The indexing steps store the determined topics and categories for each web page. The run-time module 915 provides the topics and categories determined in the indexing steps when a user requests topics for a particular web page to which the user has navigated. These modules 905, 910, 915 can be software, hardware, or a combination of software and hardware. For example, in one embodiment, one or more of the modules 905, 910, 915 are computing devices. Further, the functionality of each module 905, 910, 915 can be combined into a single software module or computing device.

Figure 11:
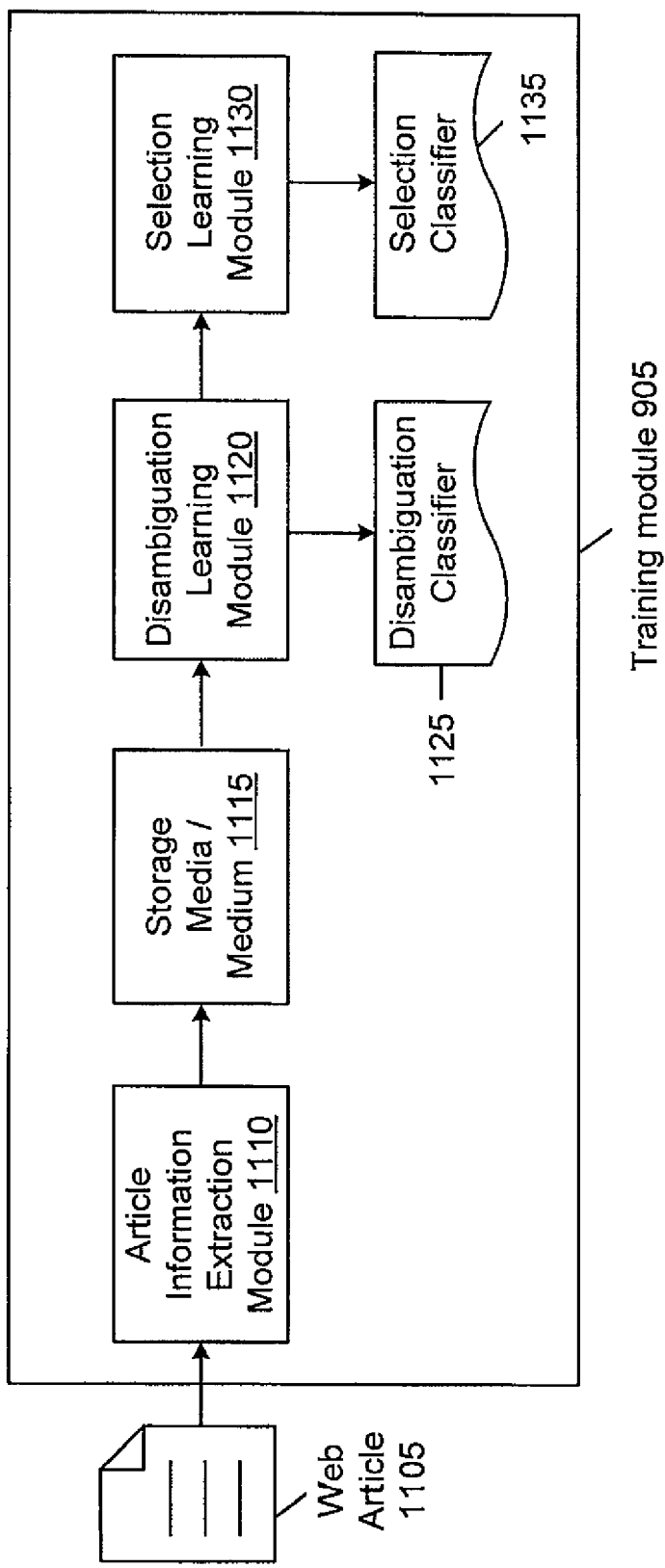
FIG. 11 is a block diagram of the training module of FIG. 9 in accordance with an embodiment of the present disclosure.
Figure 12:
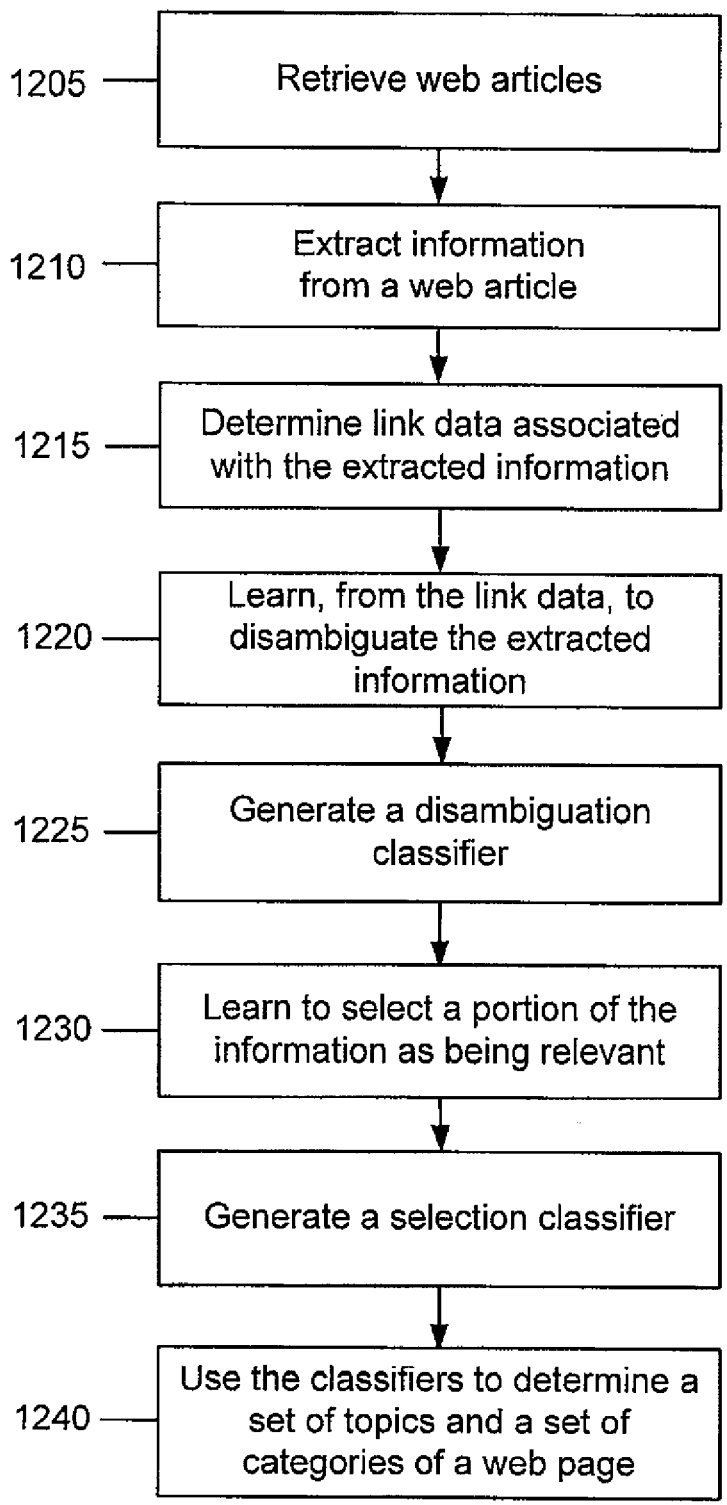
FIG. 12 is a flowchart of the steps performed by the training module of FIG. 11 in accordance with an embodiment of the present disclosure.

FIG. 11 is a block diagram of an embodiment of the training module 905. FIG. 12 is a flowchart of an embodiment of the steps performed by the training module 905. In one embodiment, the training module 905 retrieves one or more web articles 1105 (step 1205).

In one embodiment, the web articles 1105 are external documents retrieved from one or more data files such as data files from a knowledge collection website such as Wikipedia® (www.wikipedia.org). Wikipedia® has a large number of articles, and each article includes a link structure and belongs to at least one category. Further, "redirect pages" enable resolution of synonyms to an article. Each link in an article points to a disambiguated article. Further, the category hierarchy in Wikipedia® is broad and deep, and the link structure of Wikipedia® articles is a valuable source of labeled training data for disambiguation and selection, as described below.

In one embodiment, the training module 905 includes an article information extraction module 1110 to extract information from each web article 1105 (step 1210). In one embodiment, the article information extraction module 1110 is a module that disassembles the data (e.g., web articles) into a set of nodes in the Wikipedia® taxonomy. The article information extraction module 1105 can also determine link data associated with the extracted information (step 1215). The link data obtained from each web article can include, for example, its inlinks (links from other web articles), its outlinks (links to other web articles), any redirects (from synonyms), category hierarchy, and/or disambiguation (as defined below). The extraction module 1110 stores the link data and extracted information (e.g., the article's text, inlinks, outlinks, any redirects, category hierarchy, and/or disambiguation) in storage media/medium 1115 (e.g., a database). The Wikipedia® link structure forms the labeled training instances that are used to generate the disambiguation classifier and the selection classifier.

In one embodiment, a disambiguation learning module 1120 operates on the information stored in the storage media/medium 1115. As used herein, disambiguation is the process of determining a sense of a phrase (one or more contiguous words) that can have multiple senses. In one embodiment, a phrase has multiple senses if the phrase links to more than one web article. Disambiguation is the process of determining which sense is the appropriate one in a particular usage. For example, the word "tree" can relate to the woody plant or it can relate to a data structure. The way the word "tree" is used, the words around tree, etc. determine which tree usage is the correct one for a given phrase.

The disambiguation learning module 1120 learns, from the extracted information and/or link data, to disambiguate the extracted information (step 1220). In particular, in one embodiment the disambiguation learning module 1120 learns to predict the probability of a sense of an ambiguous phrase using its context (unambiguous topics). A phrase is considered unambiguous if it has only one sense. To disambiguate a phrase, feature vectors for the set of co-occurring unambiguous phrases are created. The disambiguation learning module 1120 then generates a disambiguation classifier 1125 from its learning (step 1225). In one embodiment, the disambiguation classifier 1125 is a gradient boosted decision tree created using a C4.5 algorithm. Features of disambiguation include, for example: 1) prior probability or commonness of a sense (e.g., the number of occurrences of a sense/total number of senses); 2) relatedness; and/or 3) context quality (e.g., average relatedness of context articles).

Relatedness between two topics (also referred to as concepts) is the fraction of common articles linking to both topics (concepts) versus the number of those linking to either. In one embodiment, for two Wikipedia® articles, relatedness is the Normalized Google Distance (NGD) with the function being the set of inlinks to each article. Basically, the NGD quantifies the strength of a relationship between two words. For example, "speakers" and "sound" are more related than "speakers" and "elephant." In one embodiment, the disambiguation learning module 420 finds the Google PageCount when two words are used together in a search. ("Speakers" and "sound" would have a relatively high number of result pages when compared to "speakers" and "elephant."). Thus, a Google distance is a measure of semantic interrelatedness derived from the number of hits returned by the Google search engine for a given set of keywords. Keywords with the same or similar meanings in a natural language sense tend to be "close" in units of Google distance, while words with dissimilar meanings tend to be farther apart.

The disambiguation learning module 1120 is in communication with a selection learning module 1130. The selection learning module 1130 orders topics (concepts) on how best they describe the theme of a document (e.g., web article 1105). As used herein, a theme for a document is defined as an ordered list of concepts. The list is ordered on importance of the concept to the document in question. In one embodiment, topics are one or more contiguous words that appear in a document and which are the subject of an article (node) within Wikipedia®. In particular, the selection learning module 1130 learns to select a portion of the extracted information as being relevant to the theme of the web article (step 1230). Once the selection learning module 1130 has learned to select topics, a selection classifier 1135 is generated (step 1235). The selection classifier 1135 learns to predict the probability that a topic will become an anchor. In one embodiment, the selection classifier 1135 is a gradient boosted decision tree. In one embodiment, given the context output of the disambiguation classifier, the selection learning module 1130 orders topics on how best they describe the theme of the document (e.g., web page). Anchors in Wikipedia® articles are created by, for example, following a set of linking guidelines, such as from Wikipedia®. Features of the selection classifier 1135 include "keyphraseness", disambiguation probability, relatedness to context terms, depth in the Wikipedia® taxonomy, count, distribution (e.g., number of paragraphs with occurrence/total number of paragraphs).

As described in more detail below, the selection classifier 1135 is used in the indexing phase with the disambiguation classifier 1125 to determine a set of topics and categories of a web page (step 1240). It should be noted that each module 1110, 1115, 1120, 1125, 1130, 1135 of FIG. 11 may be software, hardware, or a combination of software and hardware. Further, the functionality of one or more of the modules may be combined with one or more additional modules.

Figure 13:
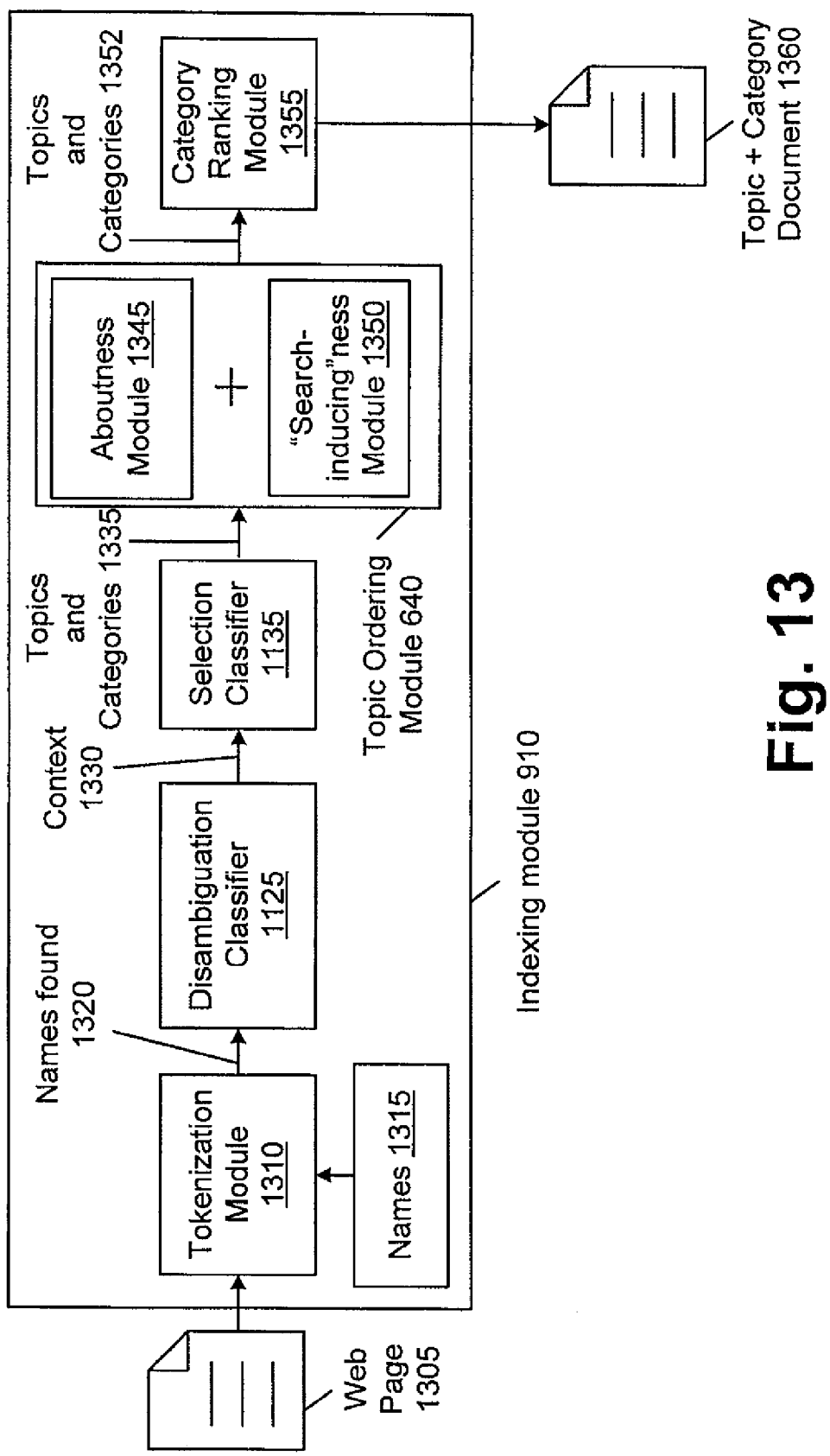
FIG. 13 is a block diagram of the indexing module of FIG. 9 in accordance with an embodiment of the present disclosure.
Figure 14:
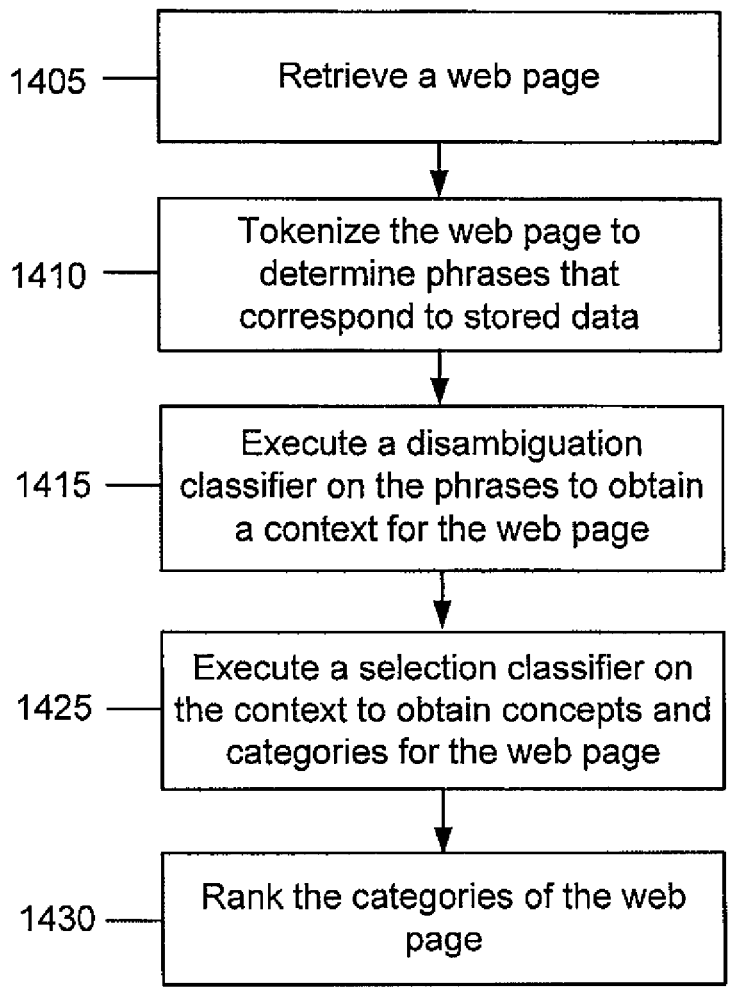
FIG. 14 is a flowchart of the steps performed by the indexing module of FIG. 13 in accordance with an embodiment of the present disclosure.

FIG. 13 is a block diagram of an embodiment of the indexing module 910. FIG. 14 is a flowchart illustrating an embodiment of the steps performed by the indexing module 910. After the offline training phase has been performed, the server 110 performs an indexing phase. In one embodiment, the server 110 sends out web searching software (often referred to as spiders) to "crawl" the web. As a result, the server retrieves one or more web pages 1305 (step 1405) and transmits each web page 1305 to the indexing module 910.

The indexing module includes a tokenization module 1310. In one embodiment, the tokenization module 1310 tokenizes each crawled web page 1305 to determine phrases (one or more contiguous words) in the web page 1305 that are associated with stored data such as with Wikipedia® names 1315 (step 1410). In one embodiment, the tokenization module 1310 transmits Wikipedia® names 1320 found in the web page 1305 to the disambiguation classifier 1125. As described above, the disambiguation classifier 1125 predicts the probability of a sense of an ambiguous phrase using the context (unambiguous topics) and outputs a context 1330 for each tokenized phrase of the crawled web page 1305 (step 1415).

Figure 15:
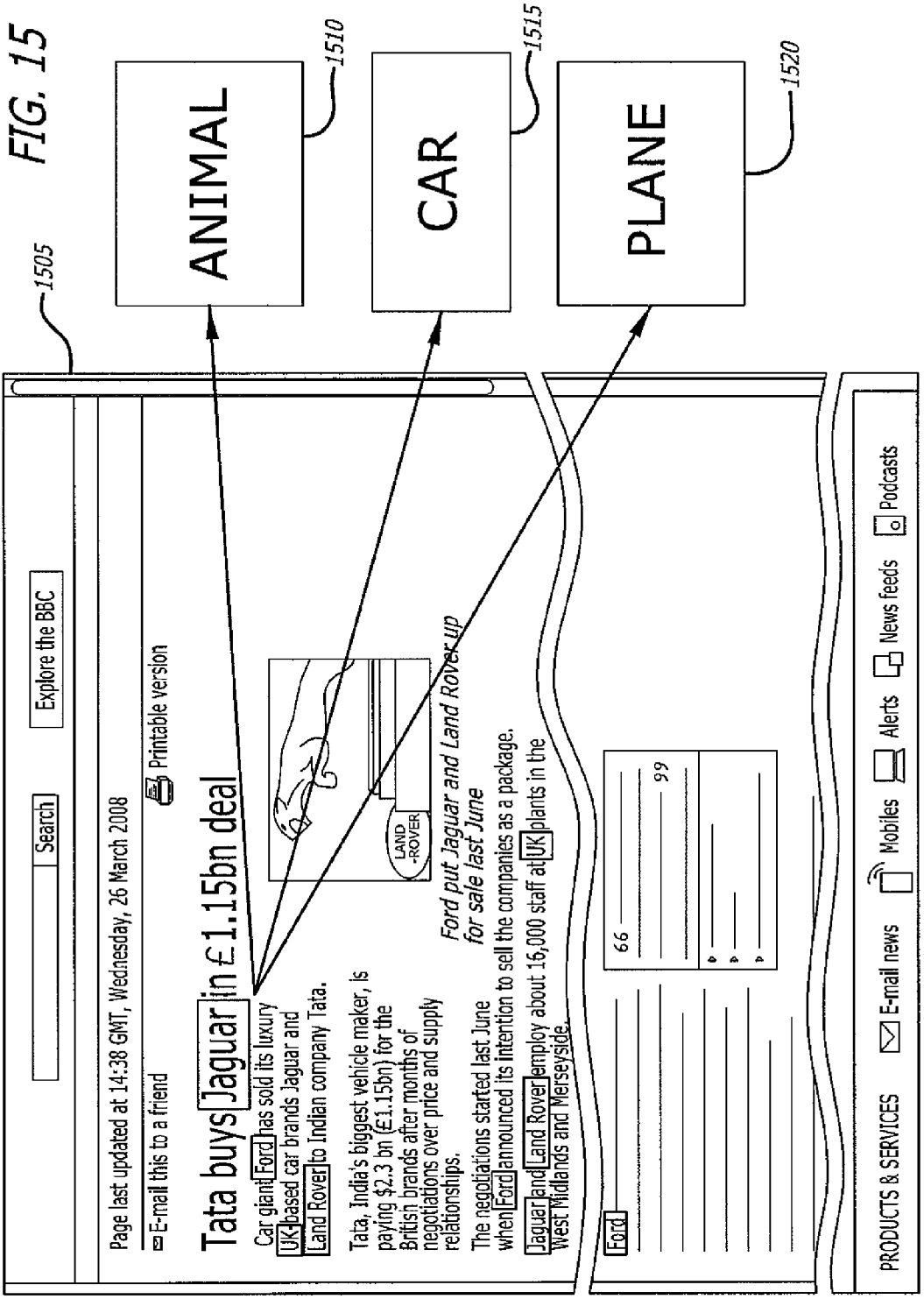
FIG. 15 is a screen shot of a disambiguation example in accordance with an embodiment of the present disclosure.

FIG. 15 is a screen shot of an embodiment of a disambiguation example. The disambiguation classifier 1125 analyzes the word "Jaguar" as found in the title of article 1505 "Tata buys Jaguar in £1.15 bn deal" and determines that "Jaguar" can be a reference to the animal (shown in box 1510), the automobile brand Jaguar (shown in box 1515), or a Jaguar fighter jet (shown in box 1520).

Figure 16A:
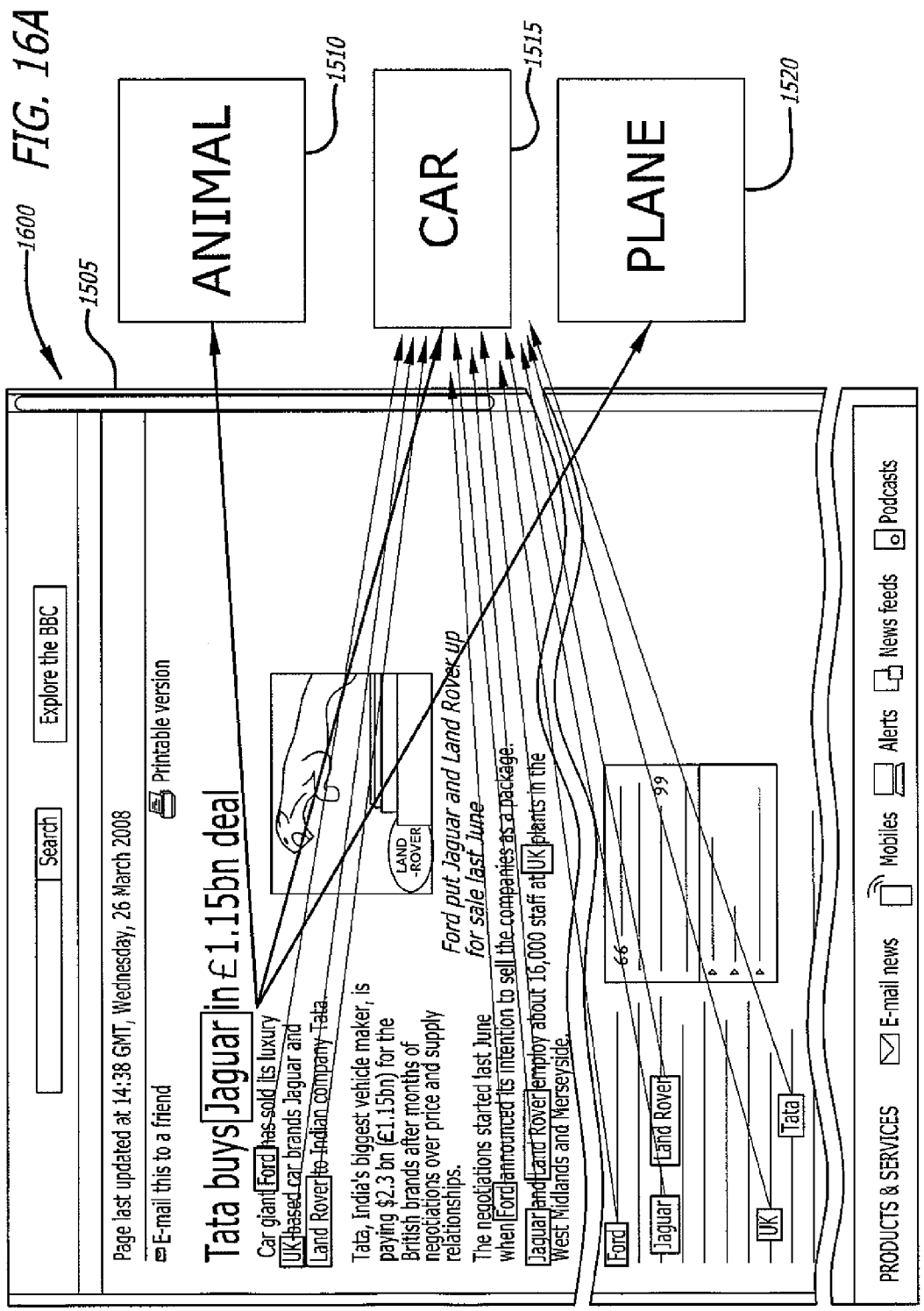
FIG. 16A is a screen shot of a disambiguation example in accordance with an embodiment of the present disclosure.

FIG. 16A is a screen shot 1600 of a further embodiment in the disambiguation example. The disambiguation classifier 1125 analyzes the article 1505 to determine that much of the phrases in the article 1505 relates to Jaguar the automobile brand 1515. The disambiguation classifier 1125 has determined the appropriate sense of the word "Jaguar" in the web article 1505. One embodiment of the output of the disambiguation classifier 1125 is shown in output window 1605 of FIG. 16B. Output window 1605 shows that the disambiguation classifier 1125 has determined that the concept or topic of the web article 1505 is "Jaguar Cars". The output window 1605 also shows that the disambiguation classifier 1125 has determined that the concept or topic "Jaguar Cars" has many associated categories, such as British brands, Car manufacturers, Tata Group, Coventry motor companies, and motor vehicle manufacturers of the United Kingdom. Each category has a corresponding weight representing how the category relates to the web article 1505. In one embodiment, the weight is a disambiguation confidence value, which can be 1 for unambiguous phrases and a value <1 for those phrases with multiple senses.

Figure 17A:
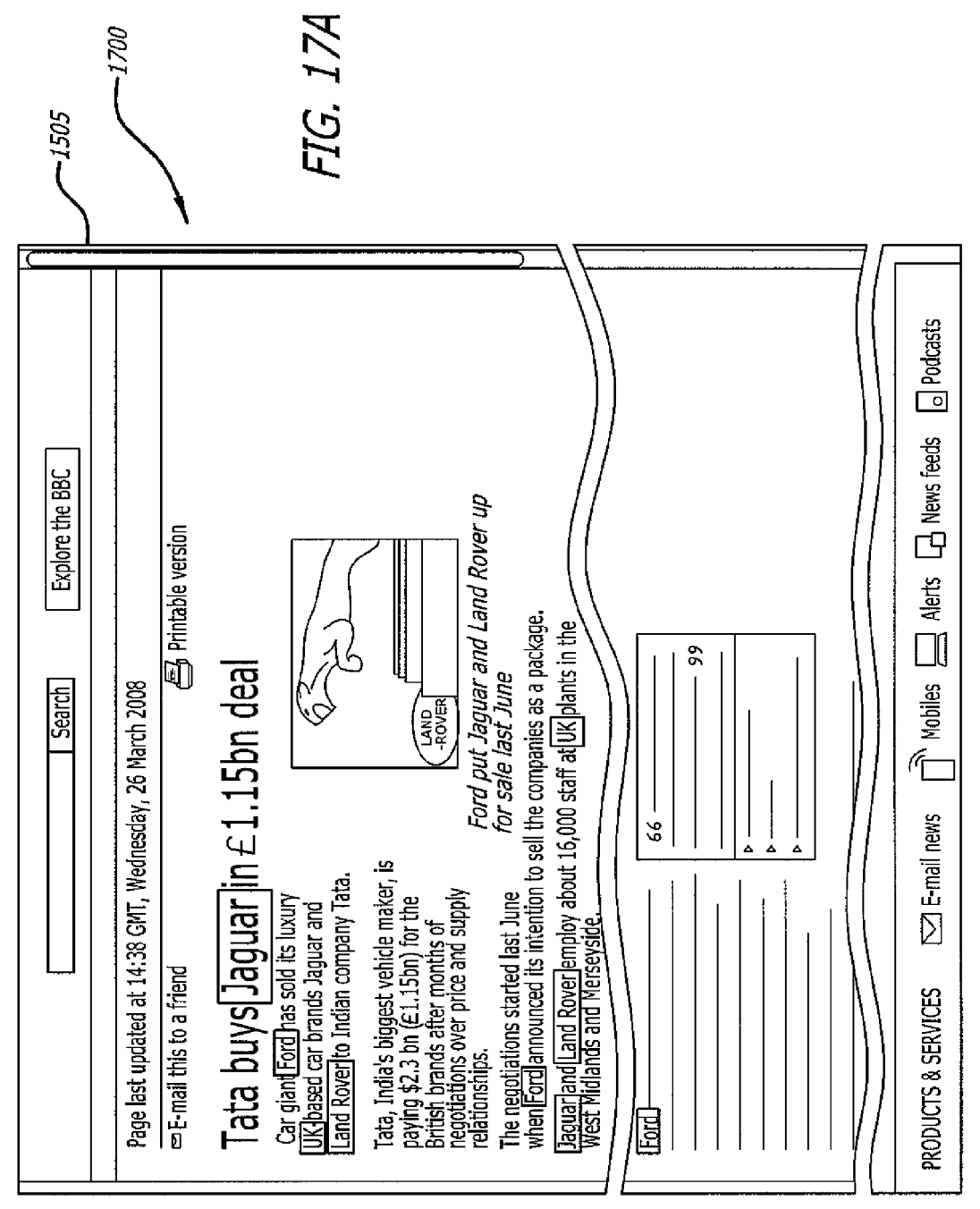
Figure 17B:
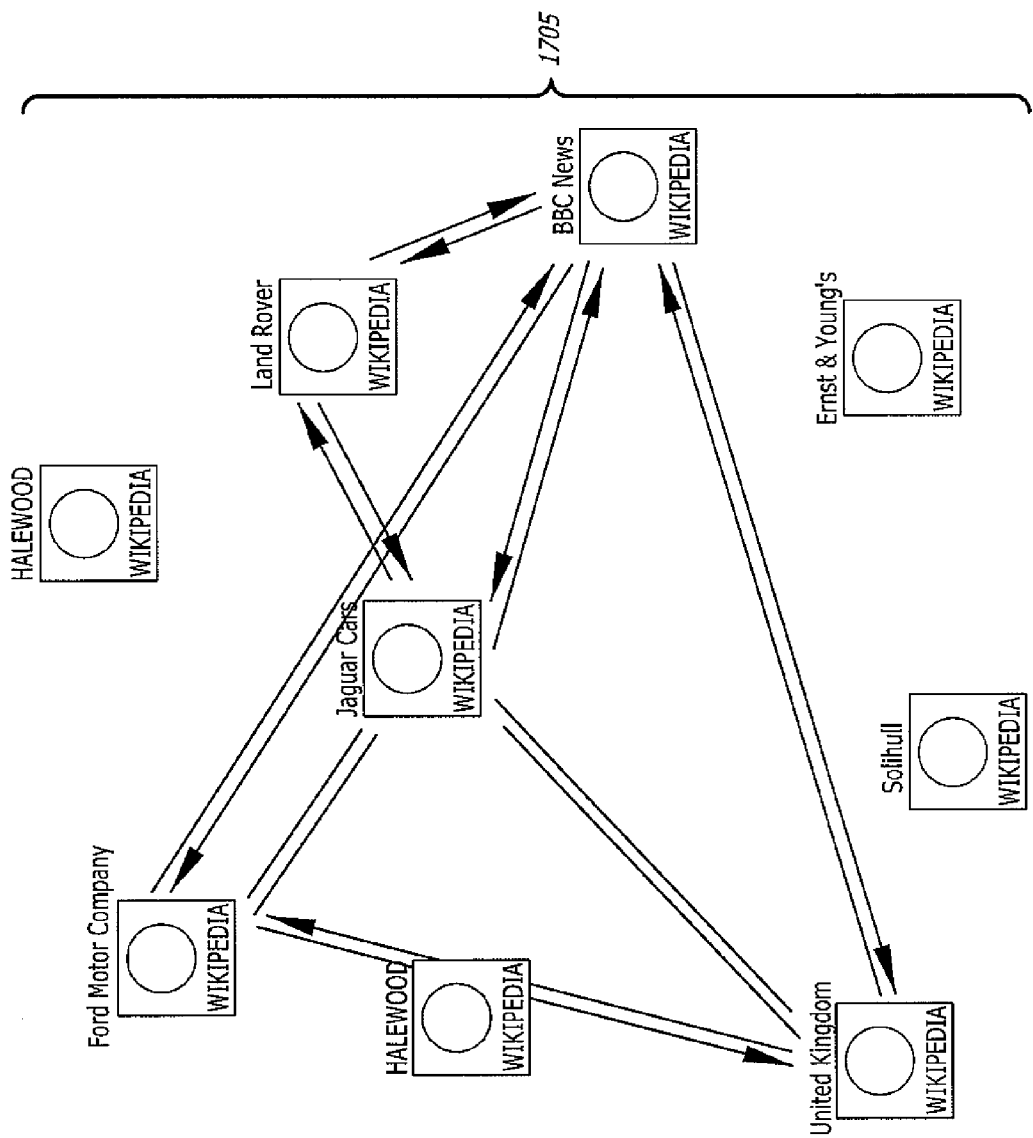
FIG. 17B is a flow diagram of topics ranked according to the selection example of FIG. 17A in accordance with an embodiment of the present disclosure.

As described above, the selection classifier 1135 is applied to the context of the phrase and orders or ranks topics on how best they describe the theme of the web page 1305. FIG. 17A is a screen shot 1700 of an embodiment of a selection example. The selection classifier 1135 receives the context of phrases in the web article 1505 and ranks topics 1705 of FIG. 17B determined from the phrases based on how best the topics describe the theme of the web page 1505. An output window 1710 of FIG. 17C of the selection classifier 1135 illustrates examples of topics found and their respective weights.

Referring again to FIGS. 13 and 14, in one embodiment, the selection classifier 1135 transmits topics and categories 1335 associated with the web page 1305 into a topic ordering module 1340. The topic ordering module 1340 includes an Aboutness module 1345 and a "Search inducing"ness module 1350. The Aboutness module 1345 filters topics that are not important to the largest cluster of coherent topics. In one embodiment, the Aboutness module 1345 is a second level filter of relevance. In one embodiment, the Aboutness module 1345 removes topics that have low association with other topics in context 1330. In one embodiment, the Aboutness module 1345 is modeled as the dominance of a topic to other topics present on the web page. In one embodiment, dominance of a topic is defined as the coverage of context topics by its outlinks. As an equation, dominance of a topic is defined as:

$$\frac{|\text{Outlinks} \cap \text{Context}|}{|\text{Outlinks}|}$$

In one embodiment, the Aboutness module 1345 ranks selected topics on Aboutness and discards those topics with a value of zero. In one embodiment, the Aboutness module 1345 provides a score for each topic identified in the web page 1305. The score represents how dominant the topic is compared with other topics found for the web page 1305. In a further embodiment, the Aboutness module 1345 provides a score (representing how dominant the topic is) and a weight for the score (representing how much weight should be given for the particular score value). In one embodiment, the Aboutness module 1345 generates a classifier to learn to choose a single dominant topic in large articles.

In one embodiment, the topic ordering module 1340 also includes a "search-inducing"ness module 1350. "Search-inducing"ness describes the probability that a term would be web-searched explicitly. In one embodiment, this module 1350 re-ranks the topics 1335 transmitted from the selection classifier 1135. "Search-inducing"ness can be calculated for each topic, treating its surface forms as search queries and is a function of one or more of the following: 1) number of queries landing on the current page 1305; 2) total number of queries; and 3) change in buzz score, where buzz in general means whether the topic under consideration is receiving a lot of attention (e.g., how newsworthy the topic currently is) on the Internet.

The topics and categories output 1352 from the topic ordering module 1340 is then applied to a category ranking module 1355. In one embodiment, the category ranking module 1355 ranks the categories 1352 further. In one embodiment, each topic belongs to many different categories. In one embodiment, the category ranking module 1355 ranks categories for each topic germane to the current context. In one embodiment, categories 1352 are ranked as a function of their agreement with those of other selected topics and depth in the Wikipedia category hierarchy. For example, the category ranking module 1355 would rank the category "American film actors" higher than "Governors of California" in a web page discussing actors for Arnold Schwarzenegger. In one embodiment, the category ranking module 1355 outputs a topic and category document 1360 (e.g., in XML) related to each web page 1305. It should be noted that each module 1310, 1315, 1125, 1135, 1340, 1345, 1350, and 1355 of FIG. 13 may be software, hardware, or a combination of software and hardware. Further, the functionality of one or more of the modules may be combined with one or more additional modules.

After the previously described phases are completed, the runtime phase is performed. A user uses the web browser displayed by the computing device 105 (as shown in FIG. 1) to navigate to a particular web page. FIG. 18 shows a screen shot of an embodiment of a web page 1805 to which the user has navigated and a sidebar 1810. The web page 1805 is displayed in a first content area 1815 of browser 1820. The sidebar 1810 is displayed in a second content area 1825 of the browser 1820. In one embodiment, URL 1830 of the web page 1805 is transmitted to the server computer 110 (as shown in FIG. 1). In one embodiment, the server computer 110 uses the URL 1830 to query its storage 155 (as shown in FIG. 1) to retrieve entities corresponding to topics associated with the web page 1805. In one embodiment, a hash is used to verify freshness of topics in the entities. The entities are displayed by the computing device in the second content area 1825 of the browser 1820. For example, entities 1840, 1845, and 1850 are displayed for the web page 1805. The entities can include, for example, text, an icon, a graphic, a link, a video, etc. associated with a topic in the set of topics.

In one embodiment, the server 110 queries its storage 155 and determines that no entities exist for the particular URL 1830. When this occurs, in one embodiment the server 110 downloads the web page 1805 and executes the indexing phase described above on the web page 1805. When the processing associated with the indexing phase is completed for the URL 1830, the server 110 transmits one or more entities associated with the web page 1805 to the computing device 105 for display.

Figure 19:
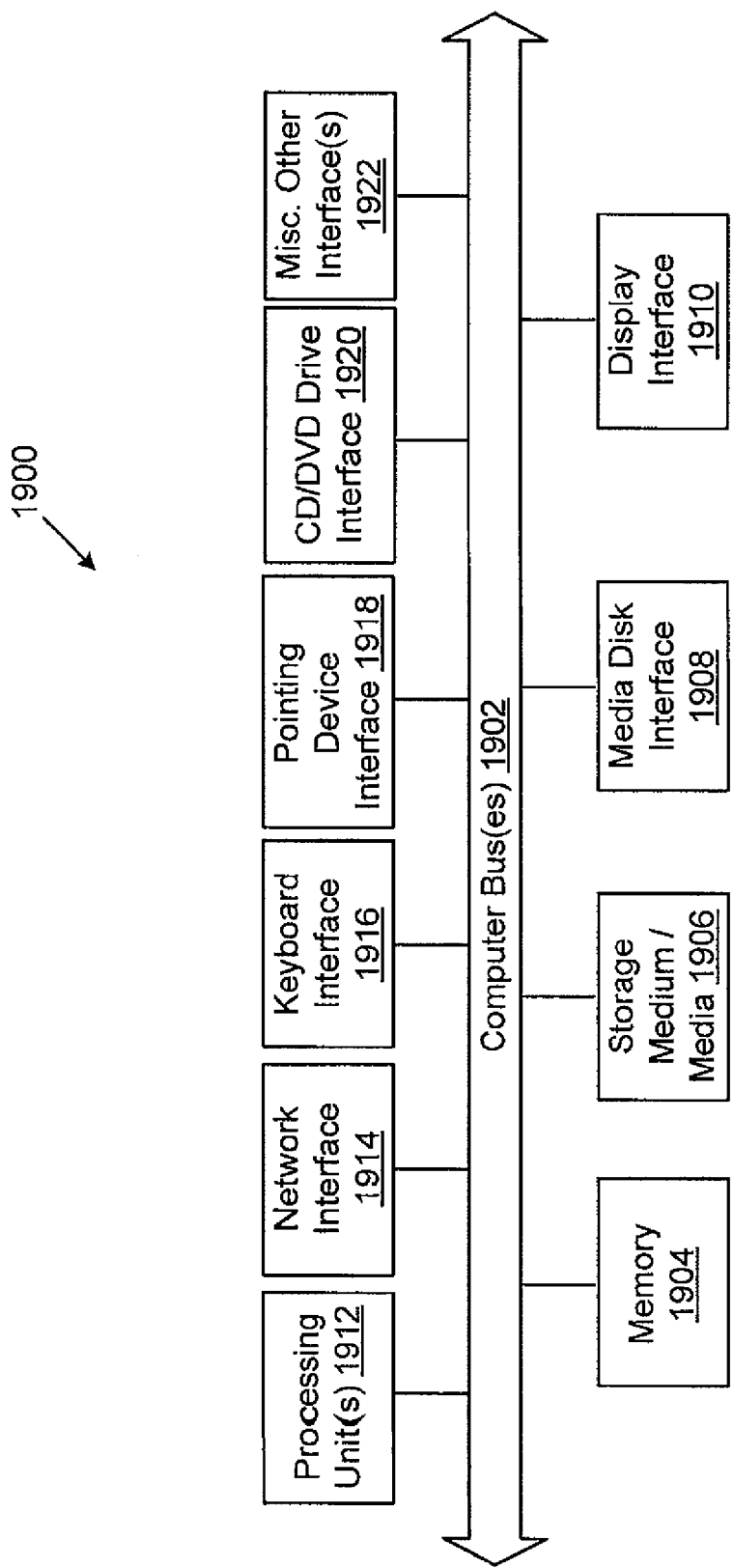
FIG. 19 is a block diagram illustrating an internal architecture of an example of a computing device, such as the server and/or computing device of FIG. 1, in accordance with an embodiment of the present disclosure.

FIG. 19 is a block diagram illustrating an internal architecture of an example of a computing device, such as server 110 and/or computing device 105, in accordance with one or more embodiments of the present disclosure. As shown in FIG. 19, internal architecture 1900 includes one or more processing units (also referred to herein as CPUs) 1912, which interface with at least one computer bus 1902. Also interfacing with computer bus 1902 are persistent storage medium/media 1906, network interface 1914, memory 1904, e.g., random access memory (RAM), run-time transient memory, read only memory (ROM), etc., media disk drive interface 1908 as an interface for a drive that can read and/or write to media including removable media such as floppy, CD-ROM, DVD, etc. media, display interface 1910 as interface for a monitor or other display device, keyboard interface 1916 as interface for a keyboard, pointing device interface 1918 as an interface for a mouse or other pointing device, and miscellaneous other interfaces not shown individually, such as parallel and serial port interfaces, a universal serial bus (USB) interface, and the like.

Memory 1904 interfaces with computer bus 1902 so as to provide information stored in memory 1904 to CPU 1912 during execution of software programs such as an operating system, application programs, device drivers, and software modules that comprise program code, and/or computer-executable process steps, incorporating functionality described herein, e.g., one or more of process flows described herein. CPU 1912 first loads computer-executable process steps from storage, e.g., memory 1904, storage medium/media 1906, removable media drive, and/or other storage device. CPU 1912 can then execute the stored process steps in order to execute the loaded computer-executable process steps. Stored data, e.g., data stored by a storage device, can be accessed by CPU 1912 during the execution of computer-executable process steps.

Persistent storage medium/media 1906 is a computer readable storage medium(s) that can be used to store software and data, e.g., an operating system and one or more application programs. Persistent storage medium/media 1906 can also be used to store device drivers, such as one or more of a digital camera driver, monitor driver, printer driver, scanner driver, or other device drivers, web pages, content files, playlists and other files. Persistent storage medium/media 1806 can further include program modules and data files used to implement one or more embodiments of the present disclosure. Persistent storage medium/media 1906 can be either remote storage or local storage in communication with the computing device.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:

scanning, by a client-side module executing on a computing device, a Document Object Model (DOM) of a first web page displayed by a browser on a display of the computing device to determine a location of a primary search query user input area associated with the first web page;

determining, by the client-side module, that a search query has been entered by a user into the primary search query user input area;

in response to the determining, automatically entering, by the client-side module, the search query entered by the user into the primary search query user input area into a secondary search query user input area associated with a predetermined second web page, the second web page determined by the client-side module based on web browsing history of the user;

displaying in a first content area of the browser the result of a search performed by a search tool represented by the first web page on the search query; and displaying in a second content area of the browser the result of a search performed by a search tool represented by the second web page on the search query.

2. The method of claim 1 wherein the entering of the search query into the secondary search query user input area further comprises entering the search query as a query parameter associated with a web page into an address bar of a browser executing on the computing device.

3. The method of claim 1 further comprising determining, by the client-side module, an intent of the user when the user enters the search query into the primary search query user input area.

4. The method of claim 3 further comprising determining, by the client-side module, the second web page based on the intent.

5. The method of claim 1 wherein the displaying of the result of the search performed by the search tool represented by the first web page further comprises displaying personalized results of the search.

6. The method of claim 1 wherein the displaying of the result of the search performed by the search tool represented by the second web page further comprises displaying personalized results of the search.

7. A non-transitory computer readable storage medium storing computer program instructions capable of being executed by a computer processor on a computing device, the computer program instructions defining the steps of:

scanning, by a client-side module executing on a computing device, a Document Object Model (DOM) of a first web page displayed by a browser on a display of the computing device to determine a location of a primary search query user input area associated with the first web page;

determining, by the client-side module, that a search query has been entered by a user into the primary search query user input area;

in response to the determining, automatically entering, by the client-side module, the search query entered by the user into the primary search query user input area into a secondary search query user input area associated with a predetermined second web page, the second web page determined by the client-side module based on web browsing history of the user;

displaying in a first content area of the browser the result of a search performed by a search tool represented by the first web page on the search query; and displaying in a second content area of the browser the result of a search performed by a search tool represented by the second web page on the search query.

8. The non-transitory computer readable storage medium of claim 7 wherein the step of entering the search query into the secondary search query user input area further comprises the step of entering the search query as a query parameter associated with a web page into an address bar of the browser executing on the computing device.

9. The non-transitory computer readable storage medium of claim 7 further comprising computer program instructions defining the step of determining an intent of the user when the user enters the search query into the primary search query user input area.

10. The non-transitory computer readable storage medium of claim 9 further comprising computer program instructions defining the step of determining the second web page based on the intent.

11. The non-transitory computer readable storage medium of claim 7 wherein the step of displaying results of the search performed by the search tool represented by the first web page further comprises the step of displaying personalized results of the search.

12. The non-transitory computer readable storage medium of claim 7 wherein the step of displaying results of the search performed by the search tool represented by the second web page further comprises the step of displaying personalized results of the search.

13. A computing device comprising:

a processor;

a display;

a storage medium for tangibly storing thereon program logic for execution by the processor, the program logic comprising a client-side module configured to:

scan a Document Object Model (DOM) of a first web page displayed by a browser on the display of the computing device to determine a location of a primary search query user input area associated with the first web page;

determine that a search query has been entered by a user into the primary search query user input area, in response to the determining, automatically enter the search query entered by the user into the primary search query user input area into a secondary search query user input area associated with a predetermined second web page, the second web page determined by the client-side module based on web browsing history of the user, display in a first content area of the browser the result of a search performed by a search tool represented by the first web page on the search query, and display in a second content area of the browser the result of a search performed by a search tool represented by the second web page on the search query.

14. The computing device of claim 13 wherein the client-side module being configured to enter the search query into the secondary search query user input area further comprises the client-side module being configured to enter the search query as a query parameter associated with a web page into an address bar of a browser executing on the computing device.

15. The computing device of claim 13 further comprising the client-side module being configured to determine an intent of the user when the user enters the search query into the primary search query user input area.

16. The computing device of claim 15 further comprising the client-side module being configured to determine the second web page based on the intent.

17. The computing device of claim 13 wherein the client-side module being configured to display the result of the search performed by the search tool represented by the first web page further comprises the client-side module being configured to display personalized results of the search.

18. The computing device of claim 13 wherein the client-side module being configured to display the result of the search performed by the search tool represented by the second web page further comprises the client-side module being configured to display personalized results of the search.

19. A server computer comprising:
  a processor;
  a storage medium for tangibly storing thereon program logic for execution by the processor, the program logic configured to:
    receive a request from a client device to download a client-side module;
    transmit the client-side module to the client device, the client-side module configured to:
      scan a Document Object Model (DOM) of a first web page displayed by a browser on a display of the client device to determine a location of a primary search query user input area associated with the first web page,
      determine that a search query has been entered by a user into the primary search query user input area,
      in response to the determining, automatically enter the search query entered by the user into the primary search query user input area into a secondary search query user input area associated with a predetermined second web page, the second web page determined by the client-side module based on web browsing history of the user,
      display in a first content area of the browser the result of a search performed by a search tool represented by the first web page on the search query, and
      display in a second content area of the browser the result of a search performed by a search tool represented by the second web page on the search query.

* * * * *